US011727583B2

(12) United States Patent
Zhang et al.

(10) Patent No.: US 11,727,583 B2
(45) Date of Patent: Aug. 15, 2023

(54) CORE-LEVEL HIGH RESOLUTION PETROPHYSICAL CHARACTERIZATION METHOD

(71) Applicants: Hao Zhang, Woodlands, TX (US); Stephen Dymmock, Spring, TX (US); Nora Patricia Alarcon, Spring, TX (US); Fei Le, Berwyn, PA (US)

(72) Inventors: Hao Zhang, Woodlands, TX (US); Stephen Dymmock, Spring, TX (US); Nora Patricia Alarcon, Spring, TX (US); Fei Le, Berwyn, PA (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 289 days.

(21) Appl. No.: 17/010,372

(22) Filed: Sep. 2, 2020

(65) Prior Publication Data
US 2022/0065096 A1  Mar. 3, 2022

(51) Int. Cl.
*G06T 7/50* (2017.01)
*E21B 47/002* (2012.01)
(Continued)

(52) U.S. Cl.
CPC .......... *G06T 7/50* (2017.01); *E21B 47/0025* (2020.05); *G06T 3/4053* (2013.01); *E21B 47/12* (2013.01)

(58) Field of Classification Search
None
See application file for complete search history.

(56) References Cited

U.S. PATENT DOCUMENTS 5,461,562 A  10/1995 Tabanou et al.
6,816,787 B2  11/2004 Ramamoorthy et al.
(Continued)

FOREIGN PATENT DOCUMENTS

WO  20160130945 A1  8/2016

OTHER PUBLICATIONS

Dahlberg, K.E. et al.; "Comparing Log-Derived and Core Derived Porosity and Mineralogy in Thinly Bedded Reservoirs: An Integrated Approach"; Society of Petrophysicists and Well-Log Analysts; 1988; 18 pages.
(Continued)

*Primary Examiner* — Xiaolan Xu
(74) *Attorney, Agent, or Firm* — Cantor Colburn LLP

(57) ABSTRACT

A method for characterizing a subsurface formation includes receiving image data of the subsurface formation obtained by a sensor tool and receiving a plurality of non-image data logs, each non-image data log being obtained by a different type of sensor tool. The method also includes performing an electrofacies analysis on the plurality of non-image data logs where the electrofacies analysis includes defining clusters wherein each cluster has a similar property to provide a plurality of electrofacies blocks with each electrofacies block representing a depth interval. The method further includes partitioning the image data into multiple high-resolution depth segments that share a similar property, feature, and/or pattern for each electrofacies block and assigning data from the plurality of non-image data logs into a corresponding high-resolution depth segment to provide a high-resolution data log that characterizes the subsurface formation.

20 Claims, 19 Drawing Sheets

(51) Int. Cl.
*G06T 3/40* (2006.01)
*E21B 47/12* (2012.01)

(56) References Cited

U.S. PATENT DOCUMENTS

| | | |
|---|---|---|
| 6,950,748 B2 | 9/2005 | Liu et al. |
| 7,133,779 B2 | 11/2006 | Tilke et al. |
| 7,526,413 B2 | 4/2009 | Dahlberg |
| 8,725,477 B2 | 5/2014 | Zhang et al. |
| 2002/0091489 A1* | 7/2002 | Ye .................. G01V 3/38 702/6 |
| 2006/0235668 A1 | 10/2006 | Swanson et al. |
| 2007/0061079 A1 | 3/2007 | Hu |
| 2007/0239359 A1 | 10/2007 | Stelting et al. |
| 2014/0025360 A1 | 1/2014 | Alshawaf et al. |
| 2015/0241591 A1* | 8/2015 | Burmester ............ G01V 3/38 702/7 |
| 2016/0025895 A1 | 1/2016 | Ziauddin et al. |
| 2016/0208582 A1* | 7/2016 | Kormaksson ........... E21B 43/00 |
| 2017/0032532 A1 | 2/2017 | Andersen et al. |
| 2017/0275982 A1 | 9/2017 | Peyaud et al. |
| 2019/0096269 A1* | 3/2019 | Sidiropoulos ........ G08G 5/0043 |
| 2019/0368316 A1 | 12/2019 | Bize-Forest et al. |
| 2020/0183042 A1 | 6/2020 | Amidi et al. |
| 2022/0238208 A1* | 7/2022 | Sengupta ............... G16H 50/30 |

OTHER PUBLICATIONS

Flaum, C.; "Enhancing Geochemical Interpretation Using High Vertical Resolution Data"; IEEE Transactions on Nuclear Science vol. 37, No. 2.; Apr. 1990; pp. 948-953.

International Search Report for International Application No. PCT/US2021/048655; International Filing Date: Sep. 1, 2021; dated Nov. 29, 2021; 4 pages.

Peyaud, Jean-Baptiste, et al.; "Improved Methodology For High-Resolution Bed Mineralogy From Wireline Logs" Society of Petrophysicists and Well-Log Analysts; 2010; 8 pages.

Ramamoorthy, Raghu et al.; "Geologically Consistent Resolution Enhancement of Petrophysical Analysis With Image Log Data" SPE Formation Evaluation; 1997; 6 pages.

Rodriguez, Luz et al.; "Quantitative and Comparative Evaluation of Mineralogy and TOC Analysis from Cores, Cuttings and Logs in Vaca Muerta Unconventional Shale Play"; Unconventional Resources Technology Conference; 2015; 24 ages.

Written Opinion for International Application No. PCT/US2021/048655; International Filing Date: Sep. 1, 2021; dated Nov. 29, 2021; 5 pages.

Zhang, Qiong, et al.; "A Novel Geological Interpretation Methodology for Derivation of Formation Lithology and Mineralogy"; Society of Exploration Geophysics; 2016; 5 pages.

* cited by examiner

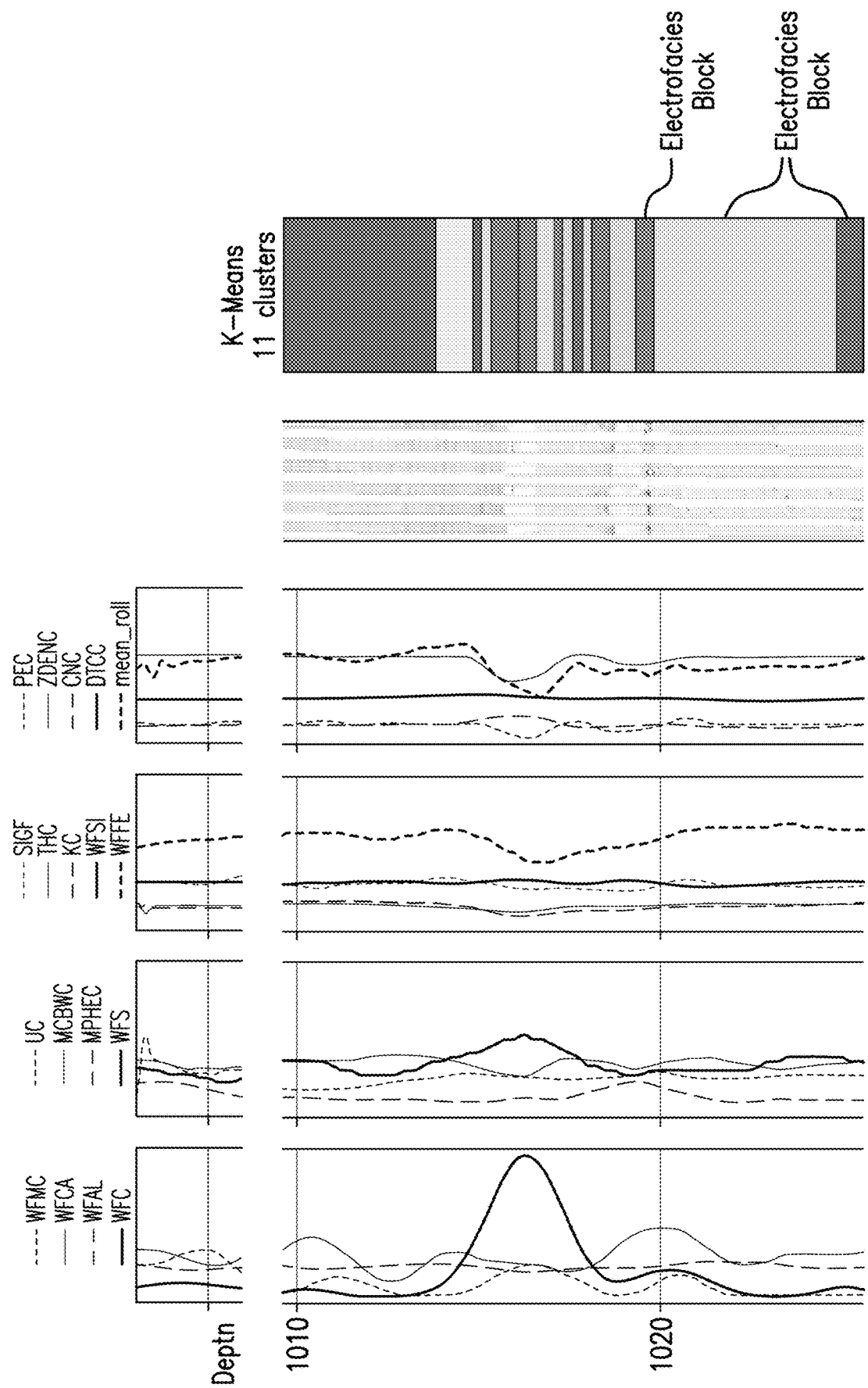

CORE-LEVEL HIGH RESOLUTION PETROPHYSICAL CHARACTERIZATION METHOD

BACKGROUND

Geologic formations can have multiple uses such hydrocarbon production, geothermal production, and carbon dioxide sequestration. High-resolution borehole images and core measurements are typically used to reduce uncertainty in formation evaluation. By reducing uncertainty in formation evaluations, resources for using the formations can be used more efficiently and with greater effect. However, core measurements, which require extraction of a core sample from a formation, are time-consuming, expensive and available only in a limited number of wells or boreholes in a field. On the other hand, high-resolution logging tools are not sufficient to provide a comprehensive evaluation for all formation properties. Hence, it would be well received in industries making use of geologic formations if methods were developed to improve the accuracy of formation evaluations.

BRIEF SUMMARY

Disclosed is a method for characterizing a subsurface formation. The method includes: receiving image data of the subsurface formation, the image data obtained using a sensor tool; receiving a plurality of non-image data logs, each non-image data log being obtained by a different type of sensor tool; performing an electrofacies analysis on the plurality of non-image data logs, the electrofacies analysis comprising defining clusters wherein each cluster has a similar property to provide a plurality of electrofacies blocks, each electrofacies block representing a depth interval; partitioning the image data into multiple high-resolution depth segments that share a similar property, feature, and/or pattern for each electrofacies block; and assigning data from the plurality of non-image data logs into a corresponding high-resolution depth segment to provide a high-resolution data log that characterizes the subsurface formation.

Also disclosed is an apparatus for characterizing a subsurface formation. The apparatus includes a processor configured to: receive image data of the subsurface formation penetrated by a borehole, the image data obtained using a downhole sensor tool disposed in the borehole; receive a plurality of non-image data logs, each non-image data log being obtained by a different type of sensor tool disposed in the borehole; perform an electrofacies analysis on the plurality of non-image data logs, the electrofacies analysis comprising defining clusters wherein each cluster has a similar property to provide a plurality of electrofacies blocks, each electrofacies block representing a depth interval; partition the image data into multiple high-resolution depth segments that share a similar property, feature, and/or pattern for each electrofacies block; and assign data from the plurality of non-image data logs into a corresponding high-resolution depth segment to provide a high-resolution data log. The processor is also configured to generate a digital rock model of the subsurface formation using the high-resolution data log, perform a flow simulation using the digital rock model to provide flow simulation output, and determine a formation property from the flow simulation output. The apparatus also includes borehole-related equipment configured to perform a borehole-related operation based on the formation property.

BRIEF DESCRIPTION OF THE DRAWINGS

The following descriptions should not be considered limiting in any way. With reference to the accompanying drawings, like elements are numbered alike:

FIGS. 4-1, 4-2 and 4-3, collectively referred to as FIG. 4, depict aspects of a virtual core workflow;

FIG. 5 depicts aspects of an example of electrofacies analysis;

FIGS. 8-1, 8-2, 8-3 and 8-4, collectively referred to as FIG. 8, depict aspects of an example of downscaling results;

FIGS. 10-1 and 10-2 depict aspects of an example of advanced high-resolution petrophysics analysis;

DETAILED DESCRIPTION

A detailed description of one or more embodiments of the disclosed apparatus and method presented herein by way of exemplification and not limitation with reference to the figures.

Disclosed are methods and apparatuses for improving evaluations of subsurface formations. The methods and apparatuses focus on providing an integrated multi-physics, multi-sensor, comprehensive petrophysical service at image resolution. A data processing method and workflow discussed further below offers a novel core-level petrophysical analysis in a fast, cost-effective, and in-situ manner compared to conventional core measurements. It may be used to replace coring and core analysis, which can be very expensive and time-consuming. On the other hand, coring information if available can be used in conjunction with this method.

Figure 1:
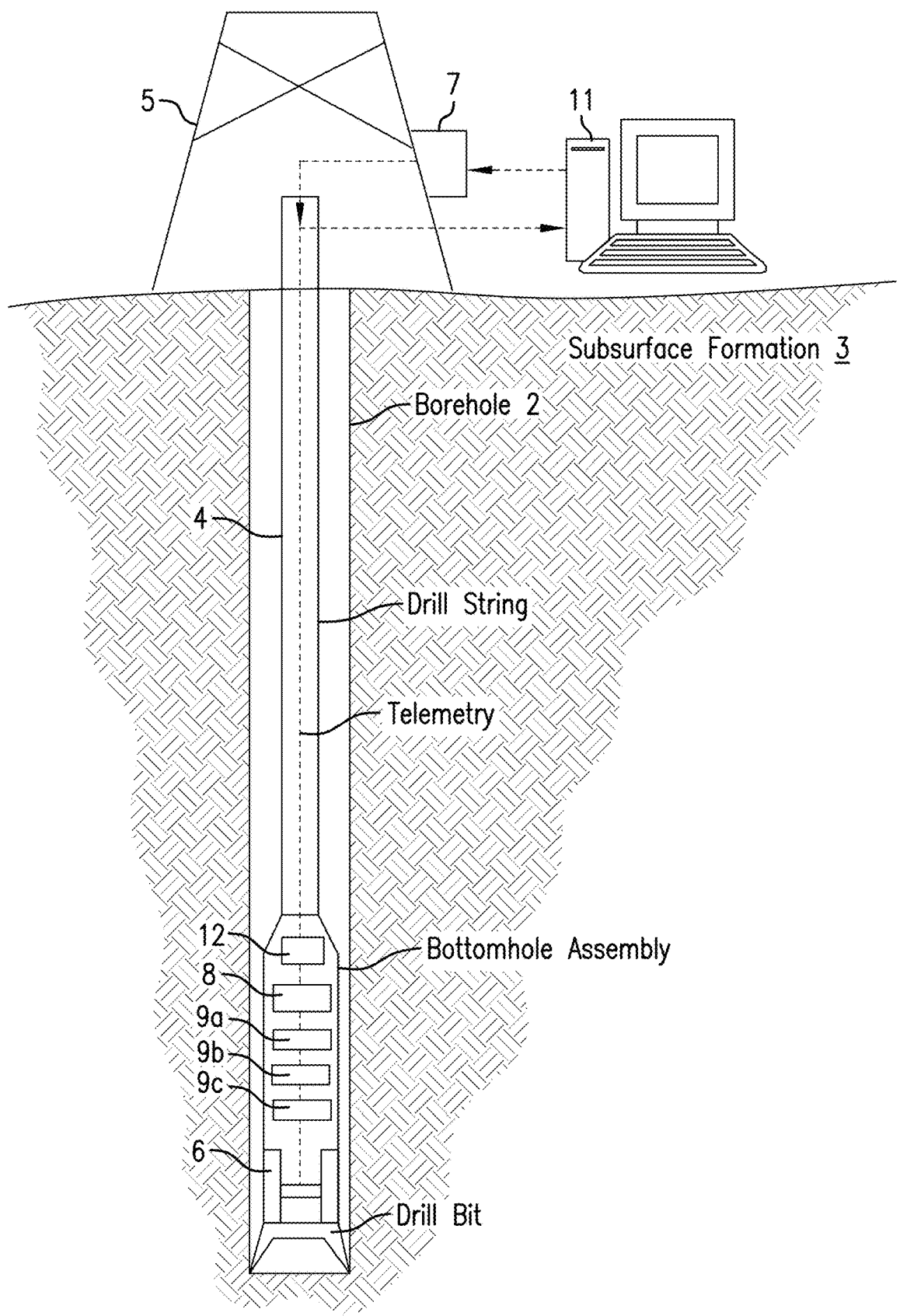
FIG. 1 illustrates a downhole tool for sensing various parameters disposed in a borehole penetrating a subsurface formation.

FIG. 1 illustrates a cross-sectional view of a downhole tool 10 disposed in a borehole 2 penetrating a subsurface formation 3, which may include a reservoir of hydrocarbons. The downhole tool 10 is conveyed through the borehole 2 by a carrier 4. In the embodiment of FIG. 1, the carrier 4 is a tubular string such as a drill string. In other embodiments, the carrier 4 can be coiled tubing or an armored wireline. The carrier 4 is operated by surface equipment 5 such as a drill rig or a winch if the carrier 4 is a wireline. A geo-steering system 6 is coupled to the carrier 4 and configured to drill the borehole 2 in a selected geometry or trajectory. The geo-steering system 6 is responsive to control signals received from a surface controller 7. In one or more embodiments, the borehole trajectory is based on results of the formation analysis that is discussed further below so as to efficiently access hydrocarbons such as by a most direct route as an example.

The downhole tool 10 includes a high-resolution imager 8 and a plurality of sensors or sensor tools 9 (e.g., 9a, 9b, 9c). The high-resolution imager 8 is configured to sense a characteristic of the formation 3 to produce an image of the characteristic as a function of depth in the borehole 2. In one or more embodiments, the high-resolution imager 8 is a resistivity tool configured to emit an electrical signal into the formation 3 and receive a return electrical signal to measure the corresponding resistivity of the formation 3. The measured resistivity is then displayed as a function of depth to form an image of the formation 3 as penetrated by the borehole 2. Various characteristics of the formation 3 such as layers having different resistivity can thus be illustrated in the image. Other types of sensors or sensor tools may be used to obtain an image log.

Regarding the plurality of sensors or sensor tools 9, each sensor or sensor tool in the plurality is configured to sense a different characteristic or property. Thus, a log of each characteristic as a function of depth can be produced. Non-limiting embodiments of the sensors or sensor tools 9 include: (1) a natural radiation detector for detecting natural radiation such as gamma rays emitted from the formation 3, (2) an acoustic tool for sensing acoustic impedance of the formation 3, (3) a neutron tool that emits neutrons into the formation 3 and measures resulting radiation such as gamma rays and/or neutrons to measure density and/or porosity of the formation 3, (4) a nuclear magnetic resonance (NMR) tool to measure porosity or other characteristic of the formation 3, (5) a gravity sensor to measure gravitational acceleration, and (6) a formation fluid testing tool configured to extract a formation fluid sample at selected depths along the borehole 2 and analyze the samples to determine content. Other types of sensors and sensor tools may also be used.

Data from the high-resolution imager 8 and the sensors or sensor tools 9 is transmitted to a surface receiver such as a surface computer processing system 11 using telemetry such as pulsed-mud or wired drill pipe. The surface processing system 11 is configured to process the received data in accordance with a workflow discussed further below. Downhole electronics 12 are configured to operate the high-resolution imager 8 and sensors or sensor tools 9, process sensed data, and act as an interface with the telemetry. Surface processing functions may also be performed by the downhole electronics 12.

While the embodiment of FIG. 1 shows the high-resolution imager 8 and the plurality of sensors or sensor tools 9 disposed in one downhole tool 10, it can be appreciated that these imaging and sensing devices can be disposed in separate downhole tools, which can be disposed in the same borehole or in a nearby borehole.

Figure 2:
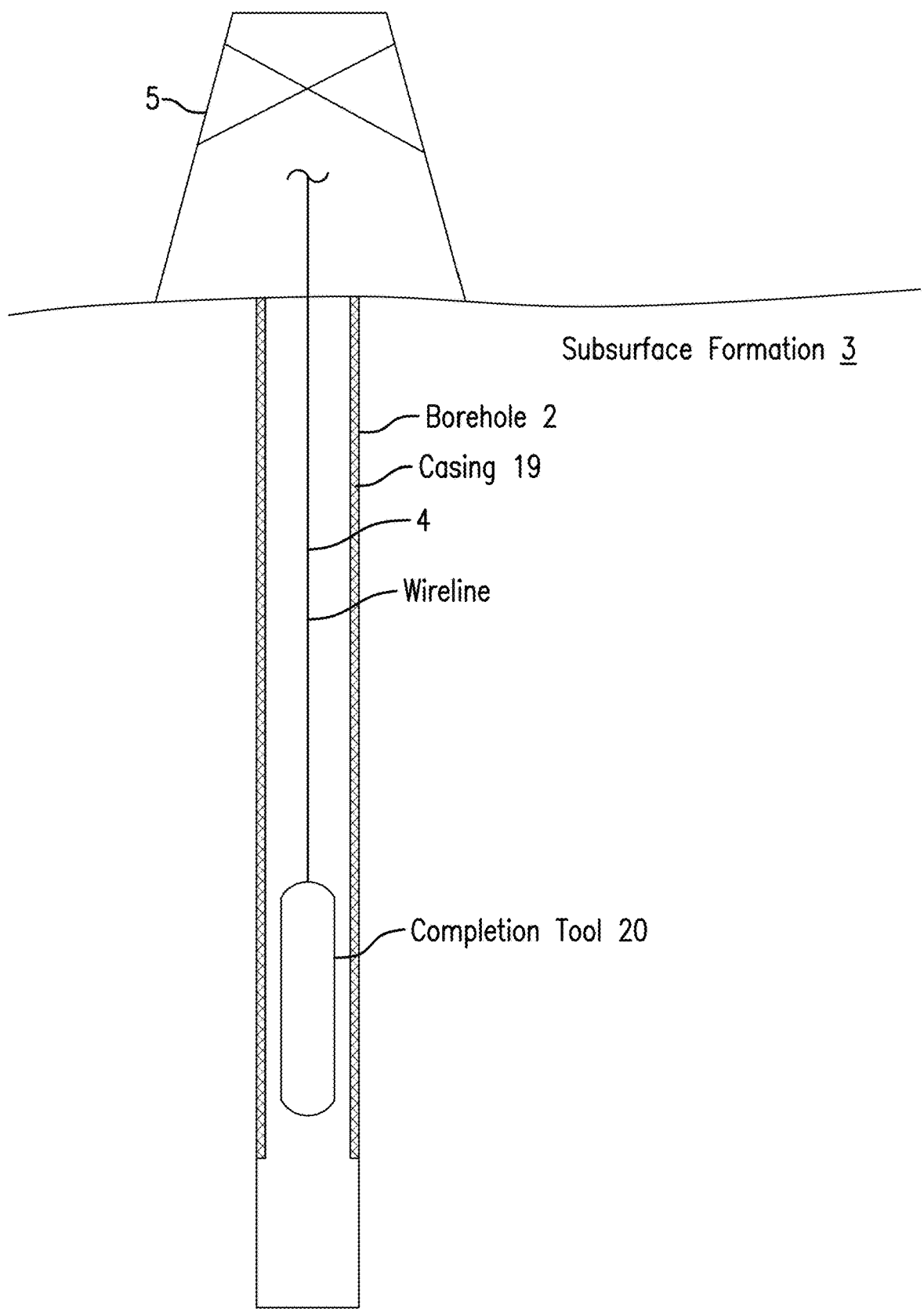
FIG. 2 illustrates a completion tool for performing a completion operation disposed in the borehole.

FIG. 2 illustrates a cross-sectional view of a completion tool 20 disposed in the borehole 2. The borehole 2 is lined by a casing 19. The completion tool 20 is configured to perform one or more completion operations at selected depths in the borehole 2. For example, the completion tool 20 may be configured to perforate the casing 19 at a selected depth to efficiently produce hydrocarbons from a reservoir at that depth based on results of the formation analysis that is discussed further below.

Formation Evaluation Methodology

Formation properties such as porosity and saturation cannot be measured directly in any forms of measurements. Instead, these properties are determined indirectly through various tool and sensor measurements including well logs and core tests. For example, formation radioactivity can be measured with gamma ray (GR) tests which are related to lithology changes; formation hydrogen ion density can be estimated in neutron logs which are sensitive to rock porosity; formation electrical galvanic or induction properties can be determined by resistivity measurements which are usually associated to reservoir fluids. In a machine learning problem which utilizes supervised learning such as regression and classification, input variables (X) and an output variable (Y) are required to learn the mapping function from the input to the output. However, a formation evaluation study only has input data (various well logs or core measurements) and no corresponding output variables (no directly measured/labeled formation properties). Therefore, unsupervised learning is adopted as the main data science model to find the underlying patterns or features in the input data. Hence, clustering is used as an unsupervised learning algorithm to process all of the unlabeled data and find natural clusters.

Figure 3:
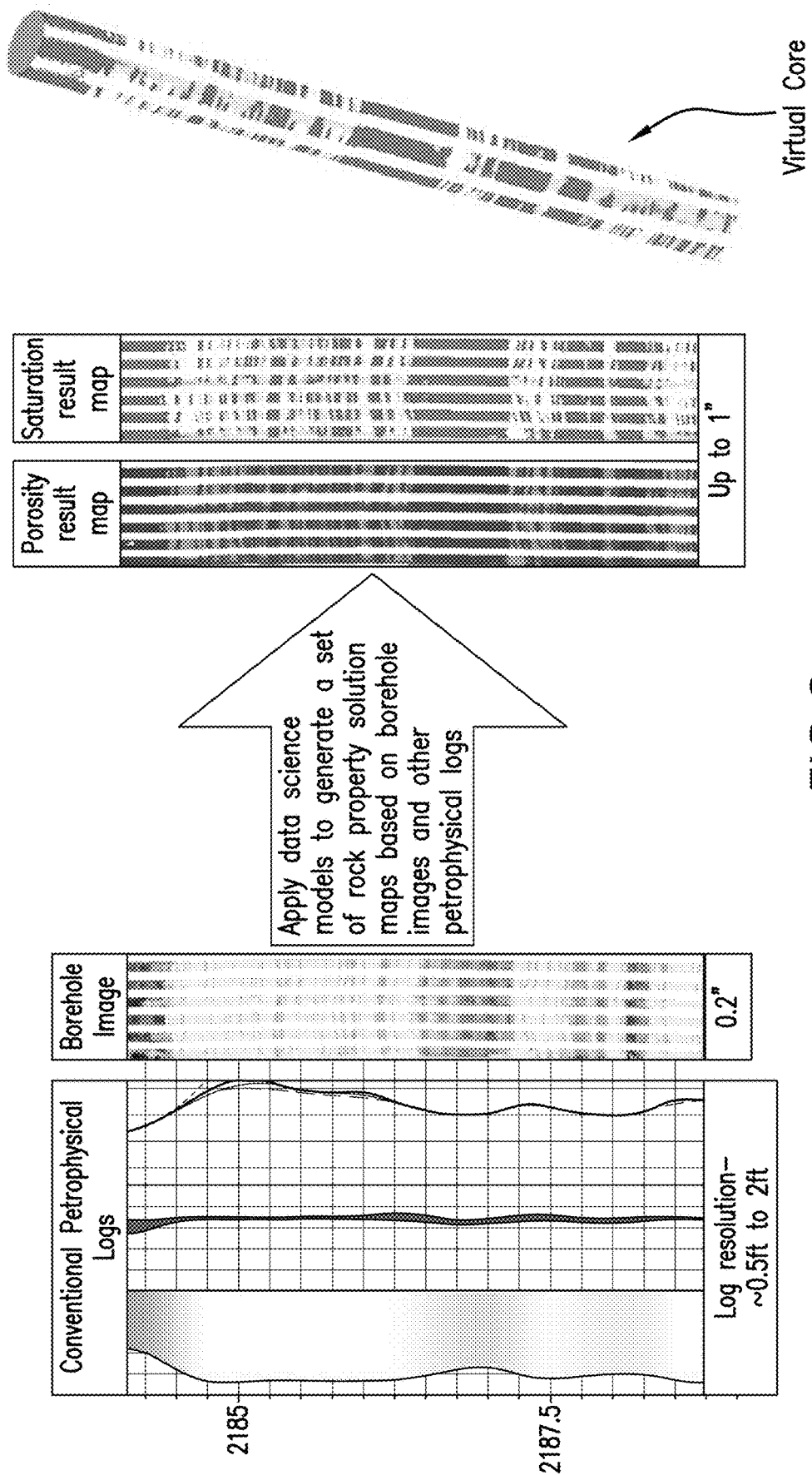
FIG. 3 depicts aspects of a virtual core concept.

The following data processing algorithm is disclosed to provide a core-level in-situ formation evaluation solution using logging data. In this algorithm, a set of formation property solution maps (two or three-dimensional models) are calculated by applying data science models on borehole images and other petrophysical logs as illustrated in FIG. 3. The formation properties include but are not limit to mineralogy, lithology, porosity, fluid saturation, permeability, and geomechanical properties. Since the analysis is not relying on core data, core measurements are optional in the disclosed algorithm. The data science models model a formation such that certain model parameters such as mineral composition will provide a corresponding sensed value by a sensor sensing a property of the formation. Hence, the data science model can be inverted such that the formation parameters (which are unknown) can be determined from the sensed value.

Figures 1, 4:
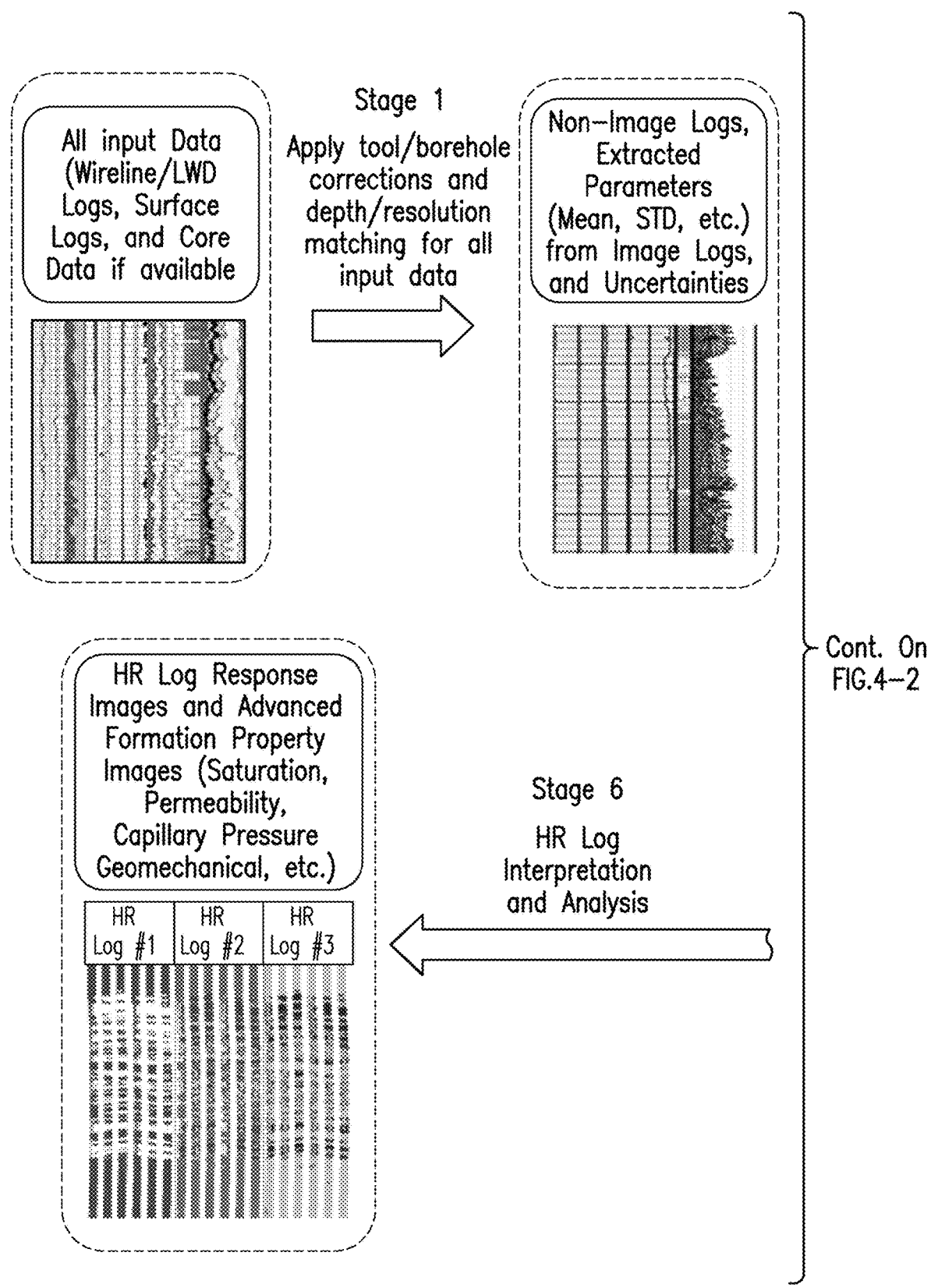
Figures 2, 4:
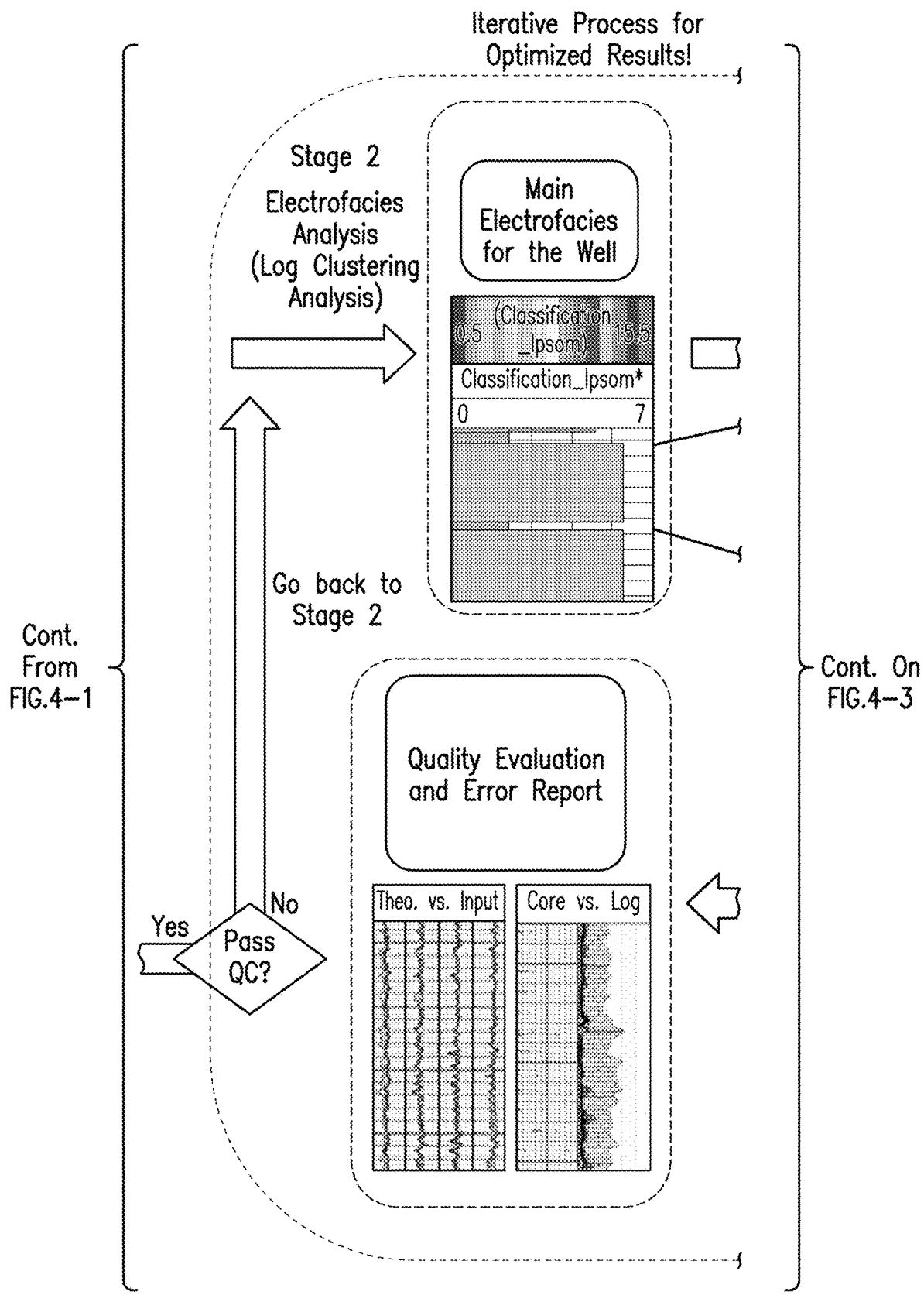
Figures 3, 4:
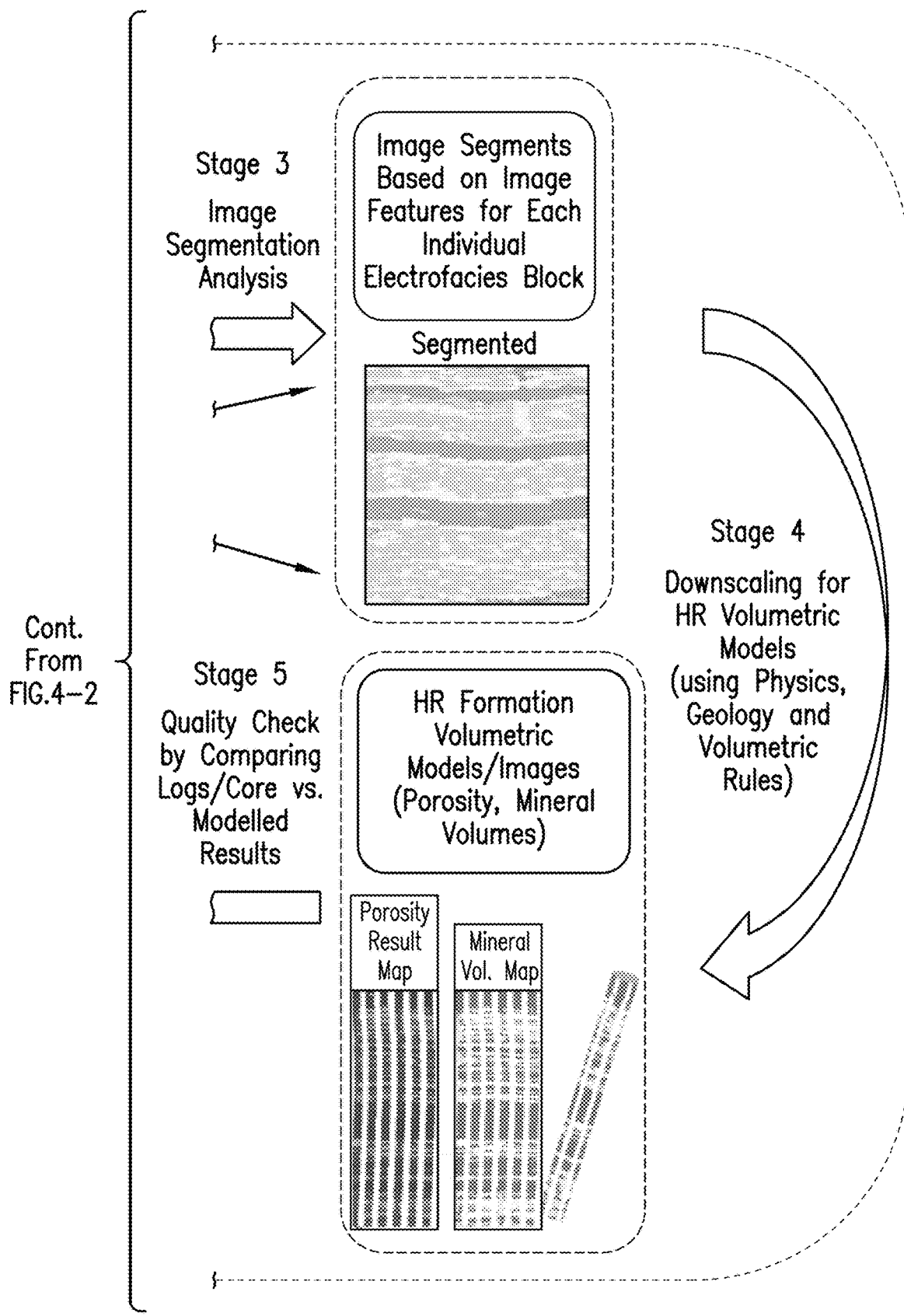

An example of a workflow used in the algorithm is presented with the following stages as illustrated in FIG. 4 and discussed in more detail below:

1. Data preparation with (a) corrections for tool configuration, corrections for tool environmental, (c) depth matching for all input data, and (d) resolution matching for all input data;
2. Electrofacies analysis (i.e., developing formation clusters) using non-image data and extracted statistical parameters from image logs from the previous stage;
3. Image segmentation analysis based on image feature extraction for each continuous electrofacies block;
4. Downscaling for high-resolution logging responses using physics models and volumetric rules (by assigning formation properties and non-image log measurements into image segments and obtain high-resolution images);
5. Quality check by comparing the computed results with core measurements (if available) and all input data; and
6. High-resolution log interpretation and digital rock analysis using defined petrophysical models and fluid simulations, then report advanced formation properties such as relative permeability and geomechanical property maps.

Once the advanced formation properties are obtained, these properties can serve as a basis for locating a new borehole or well, further drilling an existing borehole, and/or performing completion activities on drilled boreholes as non-limiting examples.

Stage 1: Data Preparation

The first stage in the workflow is to collect all input data, apply tool/borehole corrections, and perform depth matching and resolution matching. The input data may contain wireline logs, LWD (logging-while-drilling)/MWD (measurement-while-drilling) logs, surface logs, and core measurements (whole core and core plug analysis). The borehole image logs (e.g., resistivity, acoustic, nuclear, NMR, other.) and other petrophysical logs are the key pieces in the input data. Tool and other environmental corrections will remove the non-formation effects from the logs, and uncertainties for all input data are also calculated based on log correction, measurement errors, statistical accuracy, and other uncertainty models. Depth matching aligns the depths of all input data to a reference depth system. Resolution matching will filter all non-image data into the lowest vertical resolution (e.g., 2 ft for pulsed neutron logs) so all non-image logs have consistent vertical resolution.

A few statistical parameters which are related to image feature analysis (e.g., geometric mean, standard deviation, entropy, homogeneity, correlation, etc.) are extracted from borehole image logs and their rolling average values are calculated to match the same vertical resolution of the non-image data. In statistics, a moving average (rolling average or running average) is a calculation to analyze data points by creating a series of averages of different subsets of the full data set. It is also called a moving mean or rolling mean and is a type of finite impulse response filter. Variations include simple, cumulative, or weighted forms. Given a series of numbers and a fixed subset size, the first element of the moving average is obtained by taking the average of the initial fixed subset of the number series. Then the subset is modified by "shifting forward"; that is, excluding the first number of the series and including the next value in the subset.

Probabilistic models can be run to generate volumetric models (e.g., mineral volumes, porosity, and fluid saturation) which are also used in the next stage. A probabilistic method is usually performed to determine quantitative mineral volumetric formation evaluation. Probabilistic processing is done by optimizing simultaneous equations described by one or more interpretation models. Petrophysical properties affecting the tool responses may be categorized into two groups: variable parameters and constant parameters. The variable parameters are usually unknown before formation evaluation and they change with depth. Porosity and volume fractions of various minerals are examples of this type of property. The constant parameters are usually known or determined and they rarely change for a given field within certain depth intervals. Examples of this type of property are density and acoustic travel time for specific minerals. Petrophysical properties of a formation can be determined best by applying probabilistic methods simultaneously to all available logs and core measurements. The theoretical response of a well log can be written as a response equation with a set of variable parameters. Combining all tool response equations and constraints, an error function which is the weighted sum of the residual errors between the measured data and the estimated formation model, with additional penalty terms corresponding to non-satisfied constraints can be written as follows:

$$f(x) = \sum_{j=1}^{N} \left( \frac{R_j^m - R_j^{th}(x)}{\sigma_j} \right)^2 + \text{constraints}$$

where:
x represents the set of unknown petrophysical parameters,
R_j^m represents the j-th measured tool response;
R_j^th represents the j-th theoretical tool response calculated at x; and
$\sigma_j$ is the uncertainty which is the standard deviation of the error distribution assigned to the tool response. This error function represents the lack of coherence between logs, response equations, core analysis data, and constraints. The set of variable parameters which minimizes this error function yields the most probable values of the unknown properties.

The probabilistic method uses all the input logs and their associated uncertainties to determine the results based on the petrophysical model selected by the log analyst. A proper mineral model with a set of accurate apparent parameters is needed in this process. It's a recursive process to obtain a better matching model by adjusting the properties of minerals or fluid parameters based on core and logging data. After the convergence criteria are met in multivariate inversion, the results are the most probable mineral composition based on the selected petrophysical model.

To summarize, four groups of data are required in the data preparation stage:
Pre-processed non-image logging data (normalized by calculated uncertainties);
Image extracted features (mean, standard deviation, etc.) with the same vertical resolution as the non-image logging data;
Interpreted volumetric curves (mineral volumes and porosity); and
Selective QC curves (caliper log, bit size, etc.).

Stage 2: Electrofacies Analysis

The second stage is to perform electrofacies analysis which uses unique combinations of petrophysical log responses that reflect specific physical and compositional characteristics of a rock interval represented by a plurality of well log responses and other input data from the first stage. This stage defines the main rock types or clusters in non-image log resolutions (e.g., in feet). This stage may include the following tasks:
Select features (curves) to be used in electrofacies analysis;
Feature normalization (scaling);
Dimensionality reduction of the feature vector;
Clustering; and
Cluster evaluation and transform cluster labels into list of depth intervals.

Regarding feature selection and normalization, factor sensitivity analysis may be performed to select and optimize the curves to be used in electrofacies analysis. Mean uncertainty of log responses from the first step is used to normalize log responses, while predefined normalization weights are used to normalize volumetric curves and one-dimensional texture features of image log. The feature importance in clustering is determined by the feature range: the broader the range the more important the feature is.

Dimensionality reduction may be done by Principal Component Analysis (PCA) which is an orthogonal linear transformation. Number of components is selected such that more than 90% of variance is explained. For example, feature vector of 34 curves (18 log responses, 13 volumetric curves, 3 textural features) was reduced by PCA to 5 features explaining 90% of the original feature vector variance. In addition, t-distributed stochastic neighbor embedding (t-SNE) can be used to visualize resulting clusters in two-dimensional space.

Clustering means finding natural groupings among objects. Some popular clustering methods are K-mean, agglomerative hierarchical clustering, Gaussian mixture model (GMM), spectral, fuzzy C-mean clustering, etc. Neural network, association, and other unsupervised learning algorithms can also be used in this step. An example of clustering analysis is as shown in FIG. 5. In this example, the four tracks on the left include all of the input curves used in electrofacies analysis. The resistivity image log shown in the fifth track is used to extract the statistical parameters which are related to image feature analysis. The last track on the right demonstrates the electrofacies results after applying K-Means clustering analysis using the selected input curves and number of clusters set as 11. The list of curves and abbreviations in this example are shown below:

WFMG: Magnesium weight fraction in dry rock;
WFCA: Calcium weight fraction in dry rock;
WFC: Carbon weight fraction in formation;
UC: Uranium content after borehole corrections;
MCBWC: Magnetic resonance (NMR) bound water volume fraction after borehole corrections;
MPHEC: Magnetic resonance (NMR) effective porosity after borehole corrections;
WFS: Sulfur weight fraction in dry rock;
SIGF: Neutron capture cross section;
THC: Thorium content after borehole corrections;
WFSI: Silicon weight fraction in dry rock;
WFFE: Iron weight fraction in dry rock;
PEC: Photoelectric factor after environmental corrections;
ZDNC: Bulk density with borehole size/mud weight corrections;
CNC: Compensated neutron porosity with borehole size corrections;
DTCC: Acoustic slowness after environmental corrections; and
Mean_roll: Image geometrical average from resistivity image logs.

Figure 6:
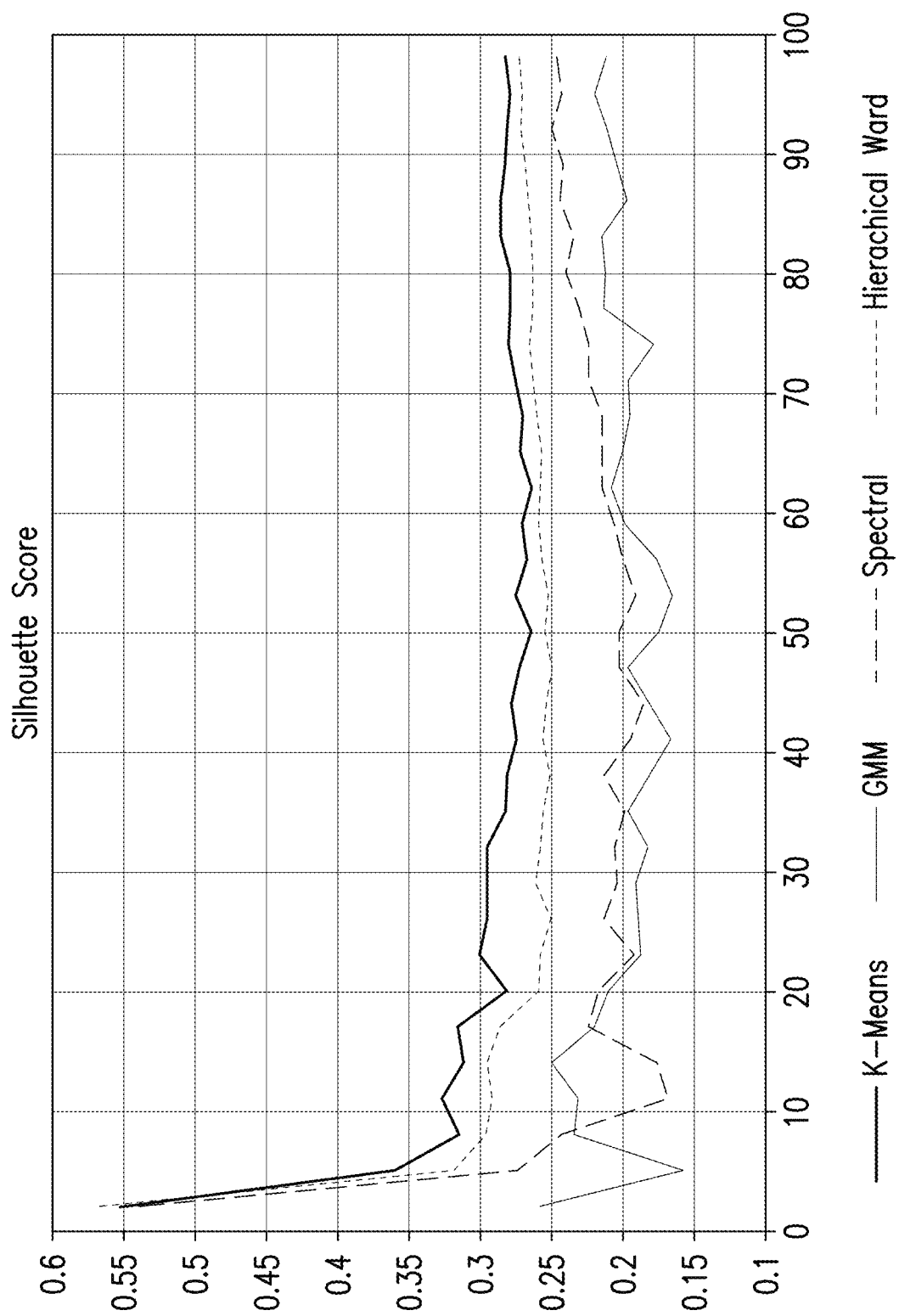
FIG. 6 depicts aspects of an example of cluster evaluation using silhouette score.

Regarding clustering evaluation, the clustering results should be properly evaluated to optimize the selection of clustering algorithms and the number of clusters. Several quality metrics can be considered such as Silhouette score (SS), Calinski-Harabasz score (CH), Davies-Bouldin score (DB), Bayesian Information Criterion (BIC), minimum/maximum number of elements in a cluster, number of isolated elements in a cluster. An example of cluster evaluation using silhouette score is illustrated in FIG. 6. In this example, four different clustering algorithms (K-Mean, Gaussian mixture model, Spectral, and Hierarchical Ward) are used and compared in Silhouette coefficient in various number of clusters. The lowest Silhouette score represents the maximum intra-cluster similarity and inter-cluster difference, which are desired in this clustering analysis.

Stage 3: Image Segmentation

Image segmentation is the process of partitioning an image into multiple segments (that may be referred to as masks). The objective of image segmentation is to simplify the representation of image logs within each electrofacies block into various masks (assigned the same labels which share similar petrophysical properties). In this application, an image log is segmented independently for each electrofacies block. Image data with or without gaps can be segmented in this step. This step defines the detailed borehole features/patterns in image log resolutions (e.g., in mm).

Several different image segmentation algorithms can be used. The first is the threshold segmentation method. Threshold segmentation is a segmentation technique used in region-based segmentation algorithms. Its essence is to automatically determine the optimal threshold according to a certain criterion, and use the image pixels to achieve clustering according to the gray level. Regional growth segmentation is another segmentation algorithm. The basic idea of the regional growth algorithm segmentation is to combine the image pixels with similar properties to form the region, that is, for each region to be divided first to find a seed pixel as a growth point, and then merge the surrounding neighborhood with similar properties of the pixel in its area. Edge detection segmentation algorithm may also be used. The edge detection segmentation algorithm refers to the use of different regions of the image pixel gray or color discontinuity detection area of the edge in order to achieve image segmentation. Segmentation based on clustering is another optional algorithm. The algorithm based on clustering is based on the similarity between things as the criterion of class division, that is, it is divided into several subclasses according to the internal structure of the sample set, so that the same kind of samples are as similar as possible, and the different kind of samples are not as similar as possible. Segmentation based on weakly-supervised learning in convolutional neural network (CNN) is yet another optional algorithm. It refers to the problem of assigning a semantic label to every pixel in the image and includes three parts. 1) Give an image which contains which objects. 2) Give the border of an object. 3) The object area in the image is marked with a partial pixel.

The image data are usually pre-processed with normalization, smoothing, and quantization steps before image segmentation. Quantization is the process of constraining an input from a continuous or otherwise large set of values to a discrete set such as defined by a set of bins each having a range of values. It is the process of mapping continuous infinite values to a smaller set of discrete finite values. In the context of simulation and embedded computing, it is about approximating real-world values with a digital representation that introduces limits on the precision and range of a value.

Various image parameters, which are sensitive to image texture analysis, can be extracted for clustering. A few examples include geometric mean, standard deviation, homogeneity, and correlation. The geometric mean is a mean or average, which indicates the central tendency or typical value of a set of numbers by using the product of their values. The standard deviation is a statistic that measures the dispersion of a dataset relative to its mean and is calculated as the square root of the variance. If the data points are further from the mean, there is a higher deviation within the data set; thus, the more spread out the data, the higher the standard deviation. Homogeneity is a gage of how homogenous the given texel (textural element) taken from the data matrix is. In other words, homogeneity describes how much equal values neighboring each other are there in a texel. Correlation is a complex gage for variance regarding texel's mean. The more equal the values in the texel, the higher the correlation attribute. The methodology of texture attribute extraction using a Gray Level Co-occurrence Matrix (GLCM) may be used to convert raw images into attribute images considering different textural aspects like contrast, homogeneity, correlation, or entropy within the raw data. With the knowledge of how different attributes are characterized and how different geological features are represented by these attributes, a procedure can be used to extract geological information automatically. Following applications of the automatic procedure are considered:

Identification of geological boundaries and calculation of dip parameters;

Creation of a rock classification by combining different texture attributes; and Identification of other geological features such as cracks, fractures, breakouts, and the like.

Figure 7:
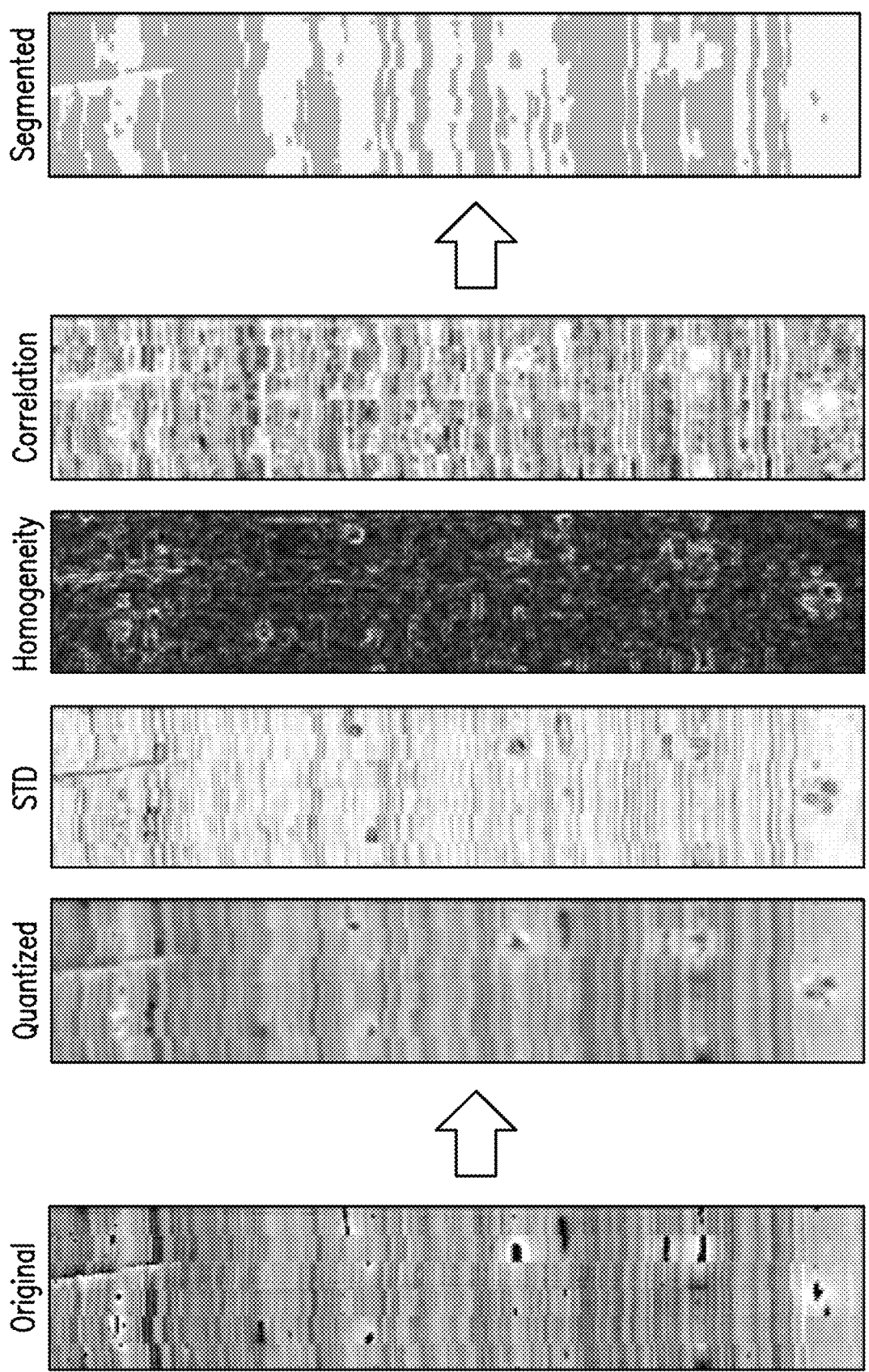
FIG. 7 depicts aspects of an example of image segmentation analysis.

A schematic example for the image segmentation stage is illustrated in FIG. 7. In this example, the original image log is converted into a quantized image. Then the standard deviation (STD) image is calculated using a 5×5 pixel STD filter. The quantized image is then converted using the GLCM method. Homogeneity and correlation images are obtained in the GLCM converted data. The last track on the right shows the segmented image after applying clustering analysis using quantized, STD, homogeneity and correlation images. In this example, two image masks are segmented in the final results.

Stage 4: Downscaling

The fourth stage in the workflow is to assign log responses into high-resolution (HR) image segments from the previous step then compute HR formation property images. This stage solves for both volumetric models and HR log responses. The main algorithms in this step includes:

Volumetric Rules
  the rolling average of HR mineral volume/porosity=low resolution volumetric curve (e.g., ~2-ft vertical resolution)
  the rolling average of HR theoretical tool responses=low resolution log responses (e.g., ~2-ft vertical resolution)

Petrophysical Constraints
  Mineral volume fractions and porosity should be negative values
  Sum of volumetric components=100%

Figures 1, 8:
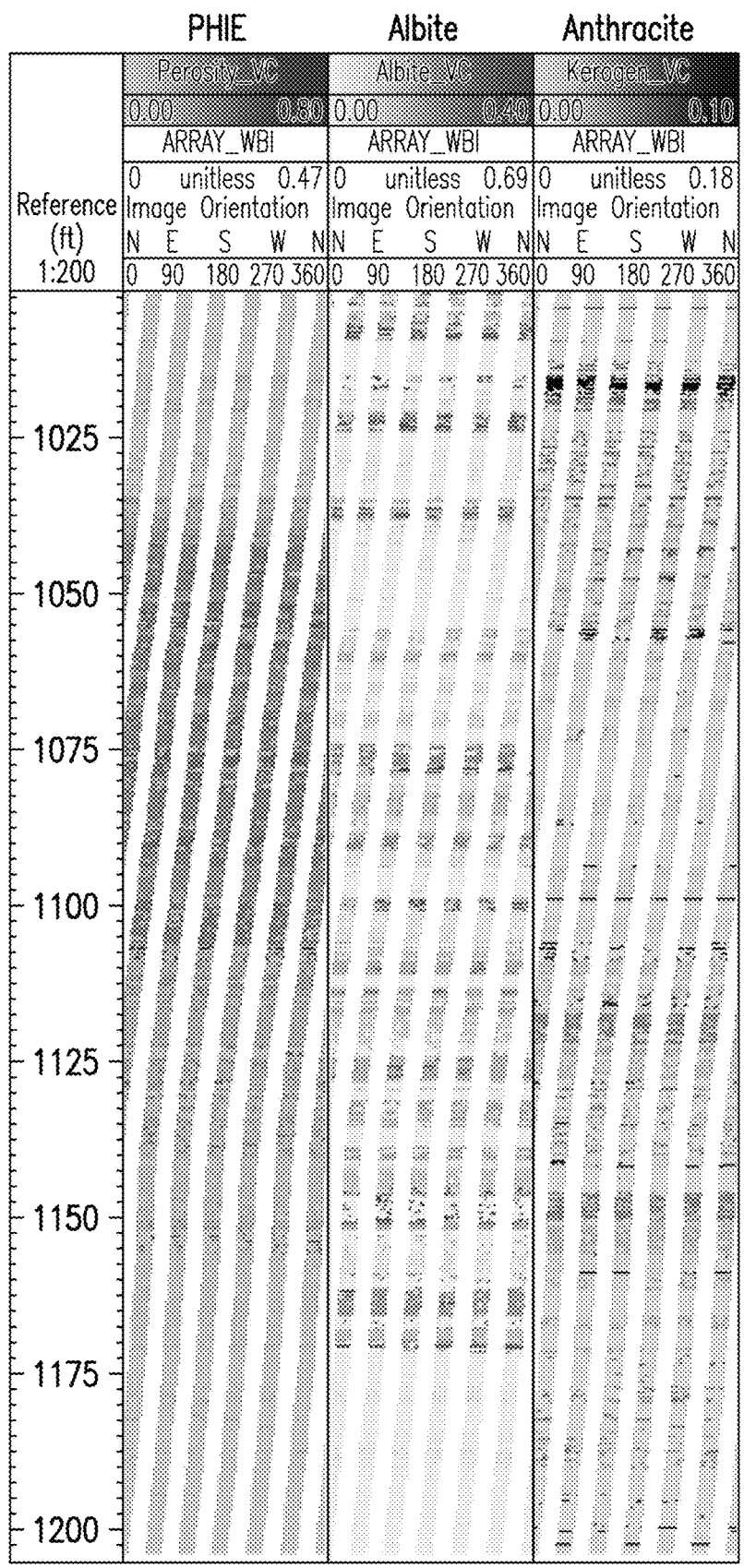
Figures 2, 8:
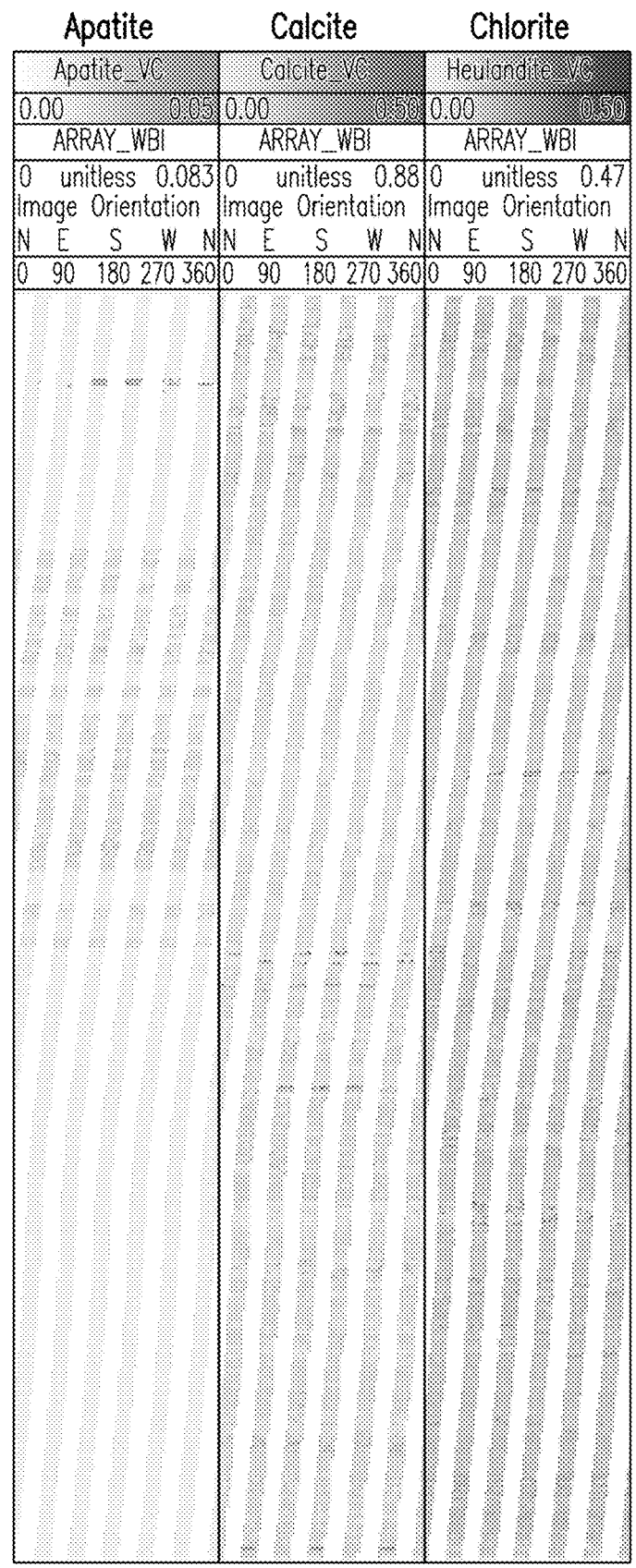
Figures 3, 8:
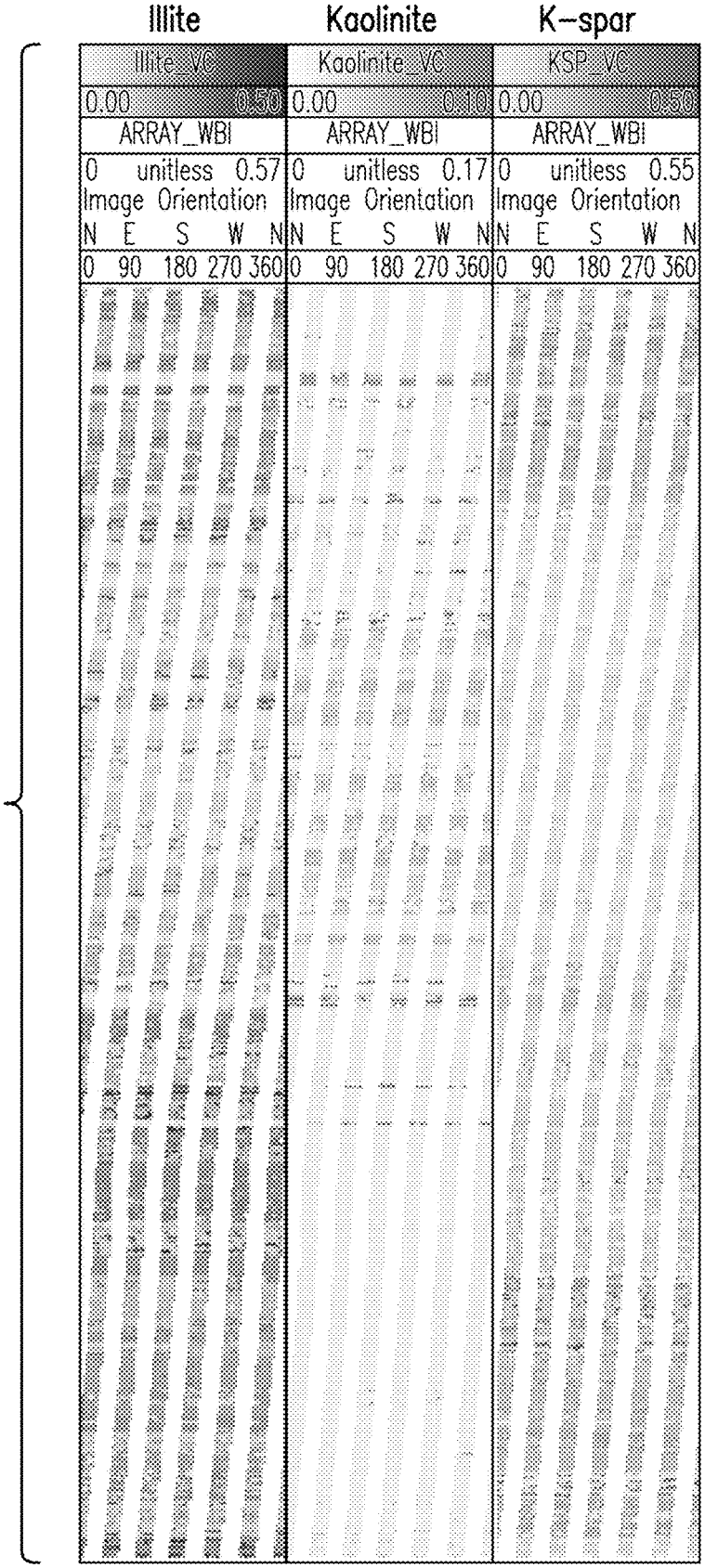
Figures 4, 8:
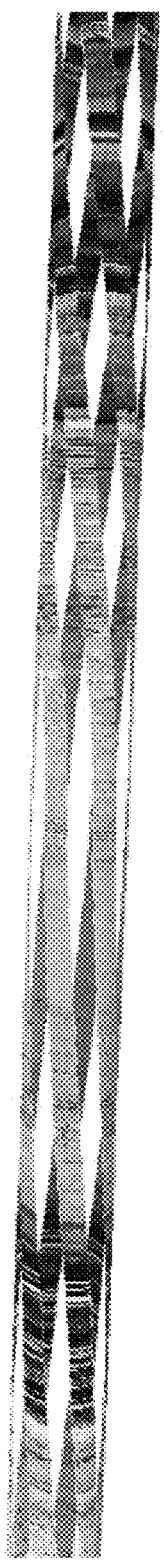

Geological Constraints
  Clay typing (such as Illite and Smectite) is based on potassium/thorium ratio
  Pyrite and Anhydrite contents are based on iron and sulfur concentrations
  User-defined minimum and maximum values An example of the downscaling results is illustrated in FIG. 8. In this example, the tracks on the left side show the porosity and mineral volumes in two-dimensional images. In these images, lighter color symbolizes lower volume fractions while darker color represents higher volume fractions. The last track shows a three-dimensional density model representing the calculated formation density distribution along the borehole.

Stage 5: Quality Check

This QC stage in the workflow is to check the quality of the high-resolution interpretation results. There are various levels of quality check:

Theoretical vs. Input data (e.g., volumetric curves+log responses);
Theoretical vs. Core data;
Confidence level in electrofacies and image segmentation tasks; and
Petrophysical/geology related QC.

QC decisions are made based on some pre-defined quality requirements:

If passed QC, user will continue to the next stage (advanced HR formation evaluation analysis);
If failed QC, user needs to go back to electrofacies stage and rerun the workflow; and
It's an iterative process until the QC requirements are met or changed.

Hyper-parameter optimization process can be used to automate QC process with a set of predefined QC requirements. For example, the difference between theoretical and input curves should be less than 5%; the confidence level in clustering should be larger than 70% or 75%; the isolated points should be less than 1%; matching depths between modelled image features and core images.

Figure 9A:
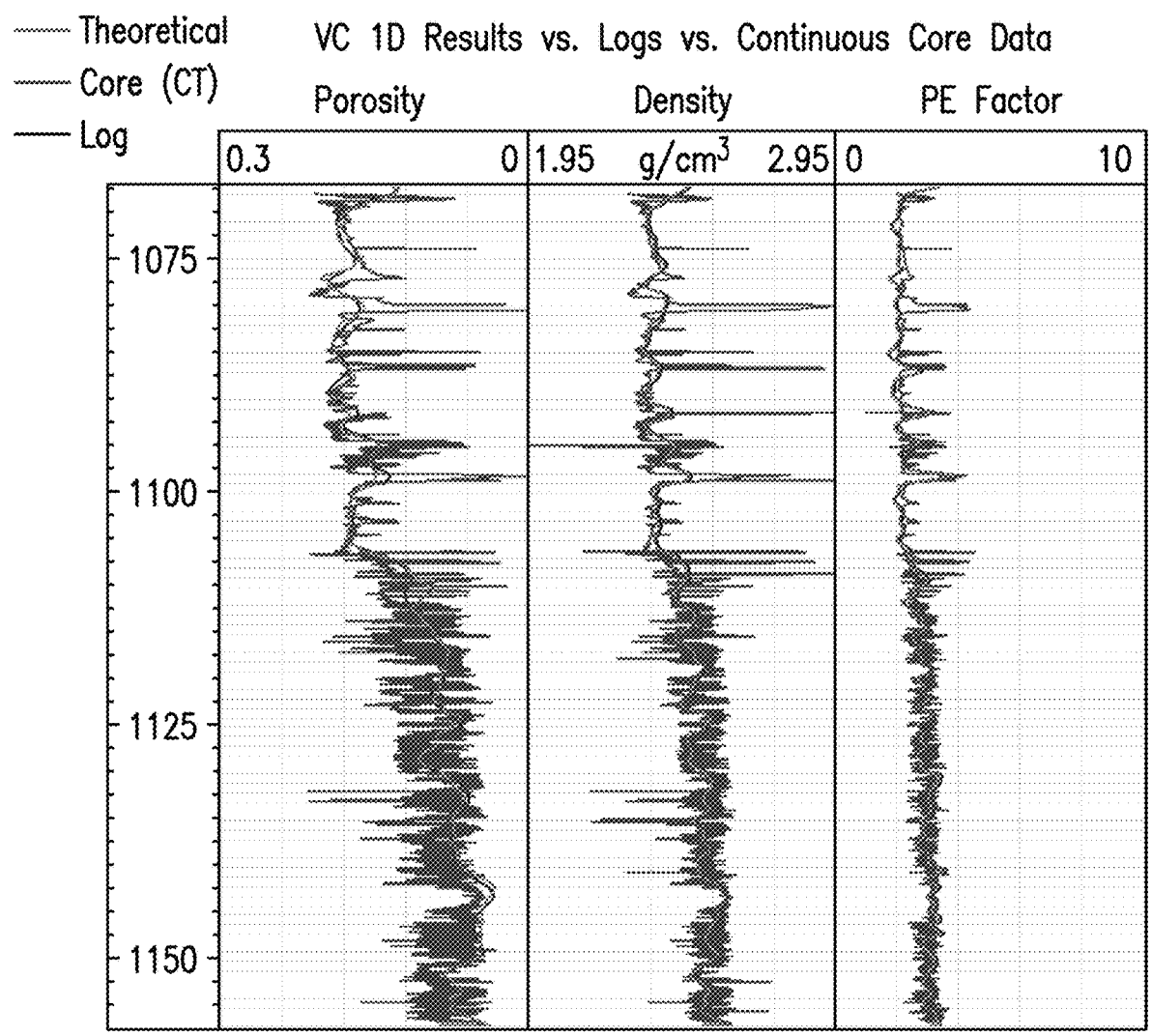
FIGS. 9A and 9B depict aspects of an example of quality control for one-dimensional and two-dimensional results.
Figure 9B:
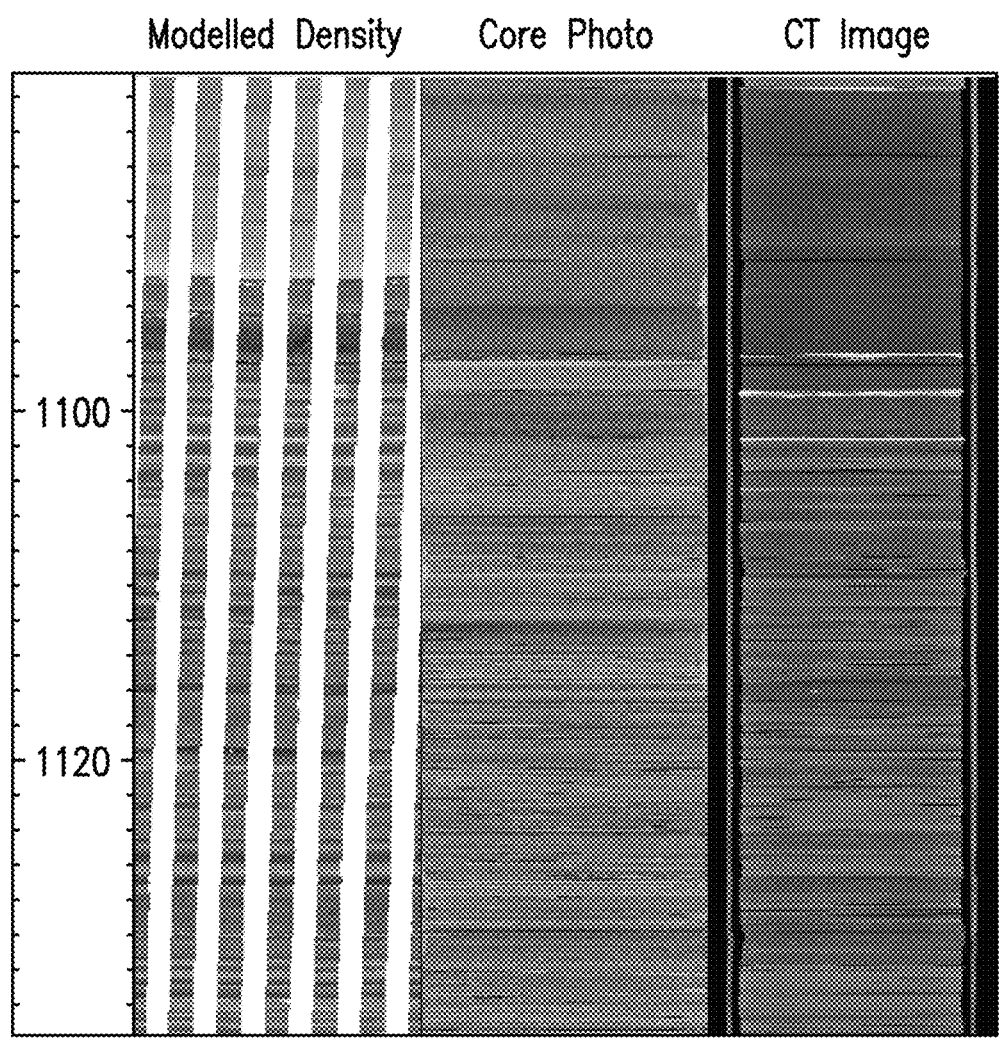

A quality check example is illustrated in FIGS. 9A and 9B. In FIG. 9A, various one-dimensional theoretical curves (porosity, density, and photoelectric factor) are calculated and compared to core measured density based on computed tomography (CT) images and input logs. These modelled one-dimensional results match very well with core and logging data with less than 5% error. FIG. 9B displays consistent trends between modelled two-dimensional density image and core images (core white-light photo in the middle and core CT image on the right side).

Stage 6: High-Resolution Petrophysical Analysis

Figures 1, 10:
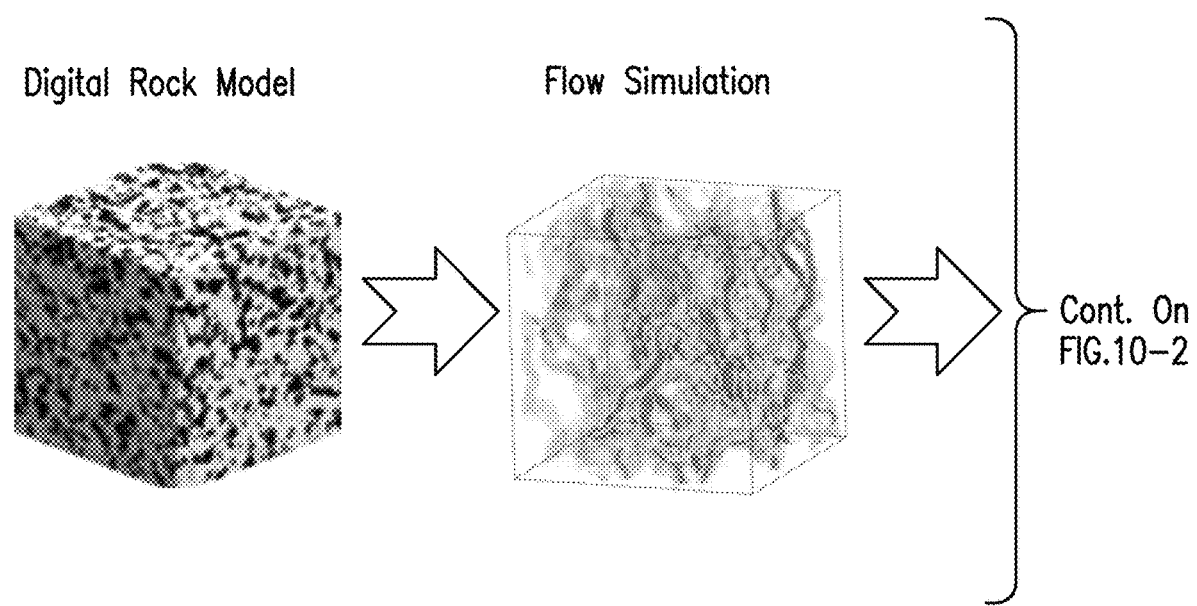
Figures 2, 10:
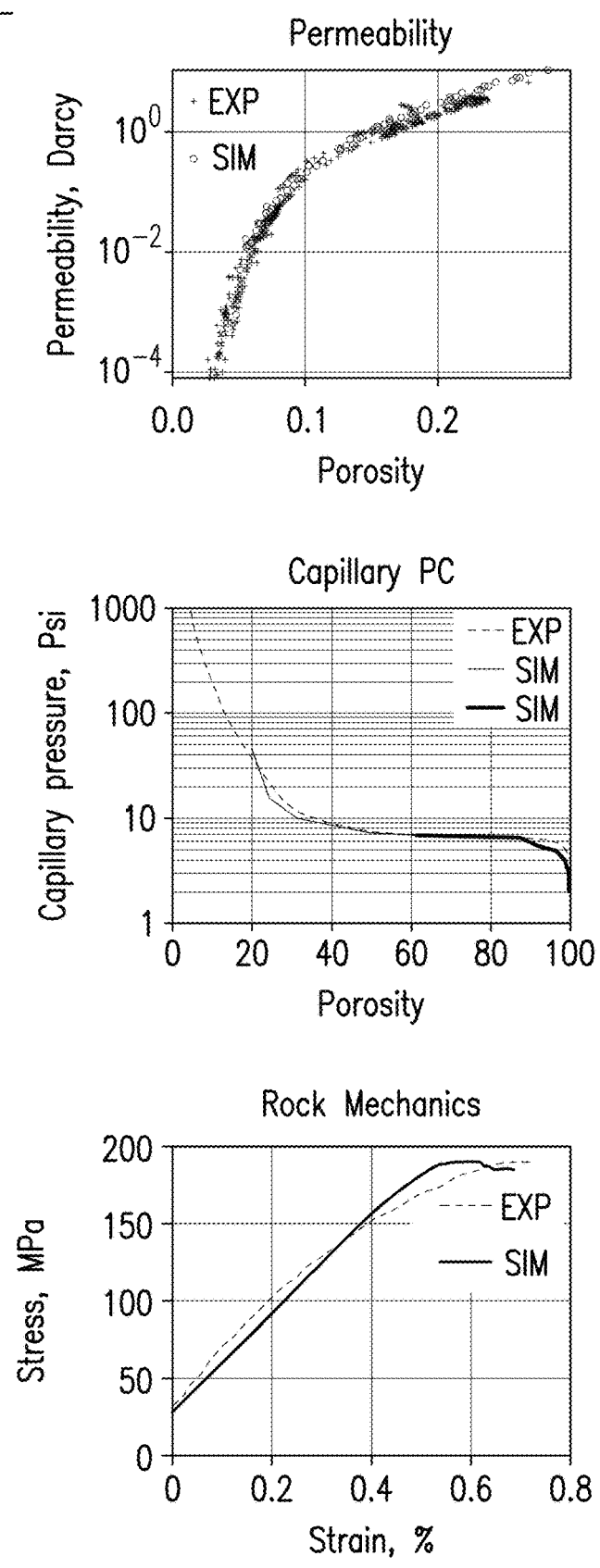

The final step in the workflow is perform high-resolution log interpretation and digital rock analysis using defined petrophysical models and fluid simulations, then report advanced formation properties such as permeability, capillary pressure, and geomechanical properties. FIG. 10 illustrates a schematic example of advanced petrophysical analysis using digital rock physics and flow simulation. In this example, the modeled formation properties are used to create core level digital rock models. Then flow simulations are performed based on the digital rock models and fluid properties. The outputs in this advanced petrophysical analysis are permeability, capillary pressure, and rock mechanical properties as non-limiting examples.

Applications of High-Resolution Petrophysical Analysis

The applications of the proposed HR petrophysical analysis can contribute to the following reservoir planning and decision-making aspects:

Optimal well position or location;
Minimize environmental risks (e.g., avoiding aquifers);
Identify best target for well completion (e.g., fracturing zones or perforation design);
Maximize production and identify sweet spots/pay zones; and
Field commercial deployment.

Figure 11:
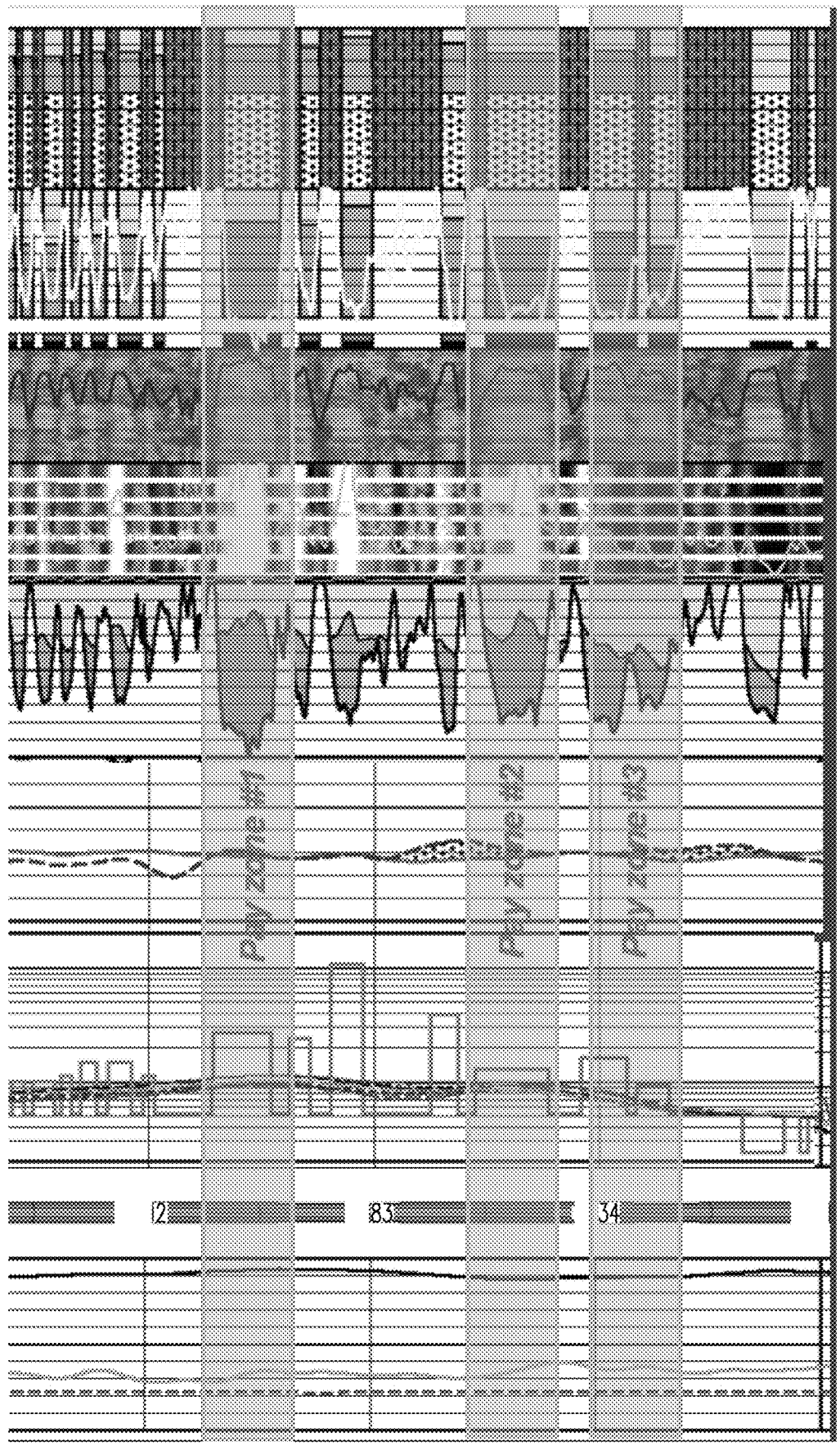
FIG. 11 depicts aspects of an example of pay zone analysis using the high-resolution petrophysical analysis.
Figure 12:
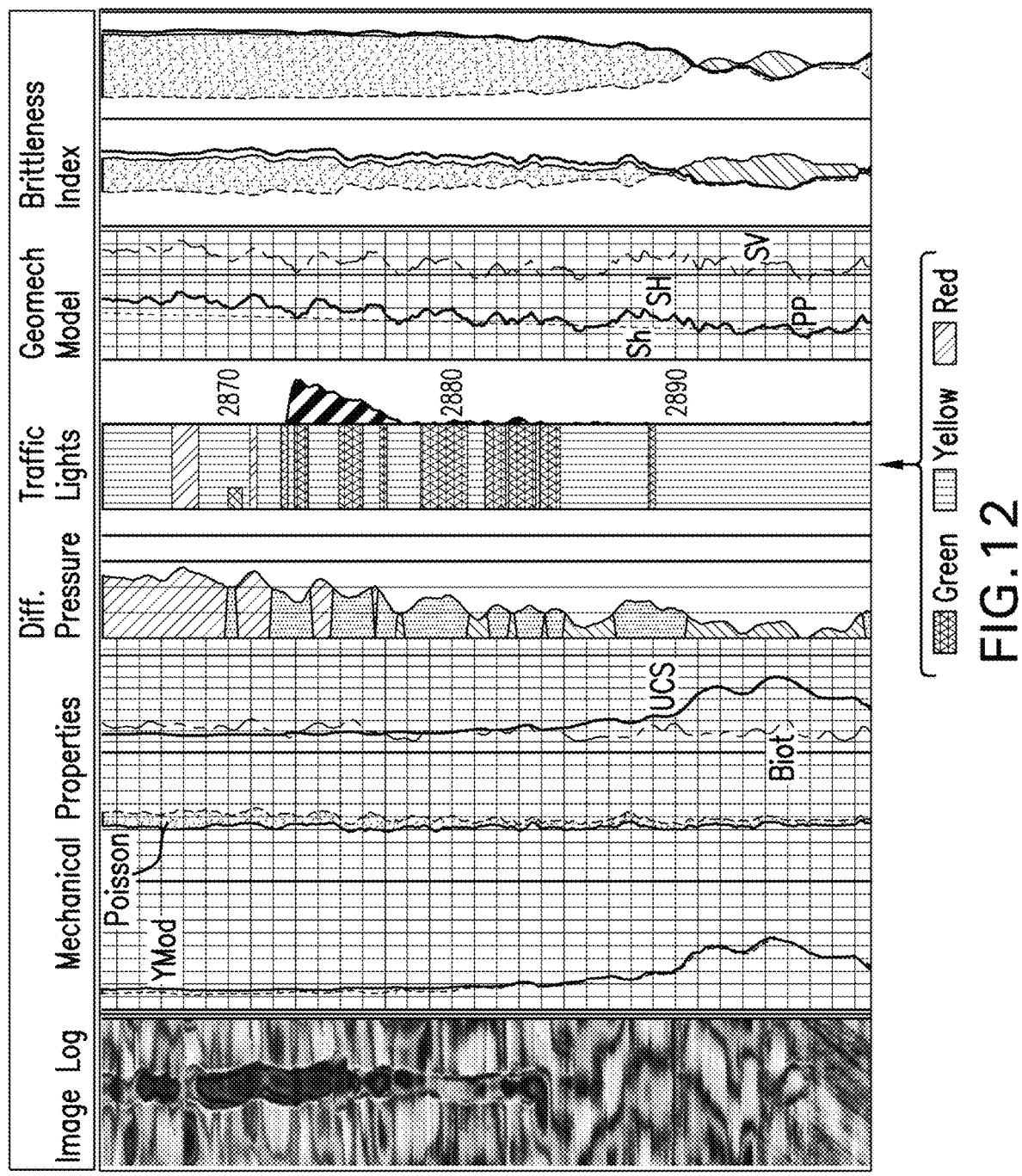
FIG. 12 depicts aspects of an example of rock mechanical analysis for fracturing zone identification using the high-resolution petrophysical analysis.

FIG. 11 illustrates an example of pay zone analysis using the HR petrophysical analysis. The pay zones are decided based on the HR fluid saturation and porosity curves (5th track). Another example for rock mechanical analysis (displayed in FIG. 12) shows some of the calculated formation mechanical properties, which are used to decide the suitable fracturing zones (represented as traffic lights in 6th track).

Output from the high-resolution analysis may be provided to a user by visual display, print out, or as a data file. The output may also be provided to other devices for control purposes or for further processing to determine other parameters.

Embodiment 1: A method for characterizing a subsurface formation, the method including receiving image data of the subsurface formation, the image data obtained using a sensor tool, receiving a plurality of non-image data logs, each non-image data log being obtained by a different type of sensor tool, performing an electrofacies analysis on the plurality of non-image data logs, the electrofacies analysis including defining clusters wherein each cluster has a similar property to provide a plurality of electrofacies blocks, each electrofacies block representing a depth interval, partitioning the image data into multiple high-resolution depth segments that share a similar property, feature, and/or pattern for each electrofacies block, and assigning data from the plurality of non-image data logs into a corresponding high-resolution depth segment to provide a high-resolution data log that characterizes the subsurface formation.

Embodiment 2: The method according to any prior embodiment, further including performing a quality check on the high-resolution data log, iterating the performing the electrofacies analysis, the partitioning, and the assigning in response to the high-resolution data log not passing the quality check, and accepting the high-resolution data log in response to the high-resolution data log passing the quality check.

Embodiment 3: The method according to any prior embodiment, wherein passing the quality check includes a difference between theoretical and input curves be less that a difference threshold value, a confidence level in clustering should be larger than a confidence threshold value, and/or a number of isolated points should be less than isolated point threshold value.

Embodiment 4: The method according to any prior embodiment, further including generating a digital rock model of the subsurface formation using the accepted high-resolution data log, performing a flow simulation using the digital rock model to provide flow simulation output, and determining a formation property from the flow simulation output.

Embodiment 5: The method according to any prior embodiment, wherein the formation property includes at least one of a permeability, a capillary pressure, and a rock mechanical property.

Embodiment 6: The method according to any prior embodiment, further including performing a borehole-related action based on the formation property using borehole-related equipment.

Embodiment 7: The method according to any prior embodiment, wherein the borehole-related action includes at least one of drilling a new borehole at a location determined by the formation property, extending an existing borehole with a trajectory determined by the formation property, or performing a completion task in the borehole as determined by the formation property.

Embodiment 8: The method according to any prior embodiment, wherein the completion property includes perforating a casing at a depth that leads directly to a reservoir of hydrocarbons.

Embodiment 9: The method according to any prior embodiment, further including performing data preparation on the image data and the non-image data logs, the data preparation including at least one of removing non-formation effects from the image data and/or the non-image data logs, calculating uncertainties associated with the image data and/or the non-image data logs and normalizing the image data and/or the non-image data logs using the uncertainties, aligning the image data and the non-image data logs to a reference depth system, filtering the non-image data logs into a lowest resolution of all the non-image data logs, extracting a statistical parameter from the image data log and calculating a rolling average of that parameter to match the lowest resolution.

Embodiment 10: The method according to any prior embodiment, further including generating a volumetric model including quantitative mineral volumetric information, porosity, and/or fluid saturation by optimizing simultaneous equations describing one or more interpretation models that relate tool responses to the mineral volumetric information, porosity, and/or fluid saturation.

Embodiment 11: The method according to any prior embodiment, wherein performing the electrofacies analysis includes reducing a number of components of a feature vector used for characterizing the subsurface formation from a first number to a second number, wherein the second number of components explains at least a threshold value of a variance of the feature vector.

Embodiment 12: The method according to any prior embodiment, wherein the reducing includes performing a principal component analysis having an orthogonal linear transformation.

Embodiment 13: The method according to any prior embodiment, wherein defining clusters includes using a mathematical technique including K-mean, agglomerative hierarchical clustering, Gaussian mixture model (GMM), spectral, and/or fuzzy C-mean clustering.

Embodiment 14: The method according to any prior embodiment, wherein defining clusters includes selecting a clustering algorithm and a number of clusters using a quality metric.

Embodiment 15: The method according to any prior embodiment, wherein the quality metric includes Silhouette score (SS), Calinski-Harabasz score (CH), Davies-Bouldin score (DB), Bayesian Information Criterion (BIC), minimum/maximum number of elements in a cluster, and/or number of isolated elements in a cluster.

Embodiment 16: The method according to any prior embodiment, wherein the partitioning includes normalization, smoothing, and quantization of the image data.

Embodiment 17: The method according to any prior embodiment, wherein partitioning includes extracting geological information from the image data set using texture analysis.

Embodiment 18: The method according to any prior embodiment, wherein using texture analysis includes using a Gray Level Co-occurrence Matrix (GLCM) to convert raw images into attribute images considering different textural aspects, the textural aspects including contrast, homogeneity, correlation, and/or entropy within the image data.

Embodiment 19: The method according to any prior embodiment, wherein assigning includes imposing volumetric rules, petrophysical constraints, and/or geological constraints on the data from the plurality of non-image data logs with respect to the high-resolution depth segments.

Embodiment 20: An apparatus for characterizing a subsurface formation, the apparatus including a processor configured to receive image data of the subsurface formation penetrated by a borehole, the image data obtained using a downhole sensor tool disposed in the borehole, receive a plurality of non-image data logs, each non-image data log being obtained by a different type of sensor tool disposed in the borehole, perform an electrofacies analysis on the plurality of non-image data logs, the electrofacies analysis including defining clusters wherein each cluster has a similar property to provide a plurality of electrofacies blocks, each electrofacies block representing a depth interval, partition the image data into multiple high-resolution depth segments that share a similar property, feature, and/or pattern for each electrofacies block, assign data from the plurality of non-image data logs into a corresponding high-resolution depth segment to provide a high-resolution data log, generate a digital rock model of the subsurface formation using the high-resolution data log, performing a flow simulation using the digital rock model to provide flow simulation output, and determining a formation property from the flow simulation output, borehole-related equipment configured to perform a borehole-related operation based on the formation property.

In support of the teachings herein, various analysis components may be used, including a digital and/or an analog system. For example, the geo-steering system 6, the surface controller 7, the high-resolution imager 8, the sensors or sensor tools 9, the surface computer processing system 11, and/or the downhole electronics 12 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured. The term "coupled" relates to being coupled directly or indirectly using an intermediate device. The terms "first" and "second" and like are used to distinguish terms and not to denote a particular order.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular component, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for characterizing a subsurface formation, the method comprising:
   receiving multi-dimensional high-resolution image data of the subsurface formation, the image data obtained using an imaging sensor tool;
   receiving a plurality of non-image data logs, each non-image data log being obtained by a different type of non-imaging sensor tool, wherein received data excludes core data and each non-image data log has a resolution that is less than a resolution of the multi-dimensional high-resolution image data;
   performing an electrofacies analysis on the plurality of non-image data logs and the multi-dimensional high-resolution image data, the electrofacies analysis comprising defining clusters based on combinations of responses of the non-image data logs that have specific physical values and specific compositional characteristics of a rock interval of the subsurface formation and extracted statistical parameters from the multi-dimensional high-resolution image data, wherein each cluster has a similar property to provide a plurality of electrofacies blocks, each electrofacies block representing a depth interval;
   partitioning the multi-dimensional high-resolution image data into multiple high-resolution segments that share a similar property, feature, and/or pattern for each electrofacies block; and
   assigning data from the plurality of non-image data logs into a corresponding high-resolution segment to provide a multi-dimensional high-resolution data log that characterizes the subsurface formation, the multi-dimensional high-resolution data log comprising mineral volumetric values and porosity volumetric values and having a resolution greater than the resolution of each of the non-image data logs.

2. The method according to claim 1, further comprising:
   performing a quality check on the multi-dimensional high-resolution data log;
   iterating the performing of the electrofacies analysis, the partitioning, and the assigning in response to the multi-dimensional high-resolution data log not passing the quality check; and
   accepting the multi-dimensional high-resolution data log in response to the multi-dimensional high-resolution data log passing the quality check.

3. The method according to claim 2, wherein passing the quality check comprises a difference between theoretical and input curves be less that a difference threshold value, a confidence level in clustering should be larger than a confidence threshold value, and/or a number of isolated points should be less than isolated point threshold value.

4. The method according to claim 2, further comprising:
generating a digital rock model of the subsurface formation using the accepted multi-dimensional high-resolution data log;
performing a flow simulation using the digital rock model to provide flow simulation output; and
determining a formation property from the flow simulation output.

5. The method according to claim 4, wherein the formation property comprises at least one of a permeability, a capillary pressure, and a rock mechanical property.

6. The method according to claim 4, further comprising performing a borehole-related action based on the formation property using borehole-related equipment.

7. The method according to claim 6, wherein the borehole-related action comprises at least one of:
drilling a new borehole at a location determined by the formation property;
extending an existing borehole with a trajectory determined by the formation property; or
performing a completion task in the borehole as determined by the formation property.

8. The method according to claim 7, wherein the completion task comprises perforating a casing at a depth that leads directly to a reservoir of hydrocarbons.

9. The method according to claim 1, further comprising performing data preparation on the multi-dimensional high-resolution image data and the non-image data logs, the data preparation comprising at least one of:
removing non-formation effects from the multi-dimensional high-resolution image data and/or the non-image data logs;
calculating uncertainties associated with the multi-dimensional high-resolution image data and/or the non-image data logs and normalizing the multi-dimensional high-resolution image data and/or the non-image data logs using the uncertainties;
aligning the multi-dimensional high-resolution image data and the non-image data logs to a reference depth system;
filtering the non-image data logs into a lowest resolution of all the non-image data logs;
extracting a statistical parameter from the multi-dimensional high-resolution image data and calculating a rolling average of that parameter to match the lowest resolution.

10. The method according to claim 1, further comprising generating a volumetric model comprising quantitative mineral volumetric information, porosity, and fluid saturation by optimizing simultaneous equations describing one or more interpretation models that relate tool responses to the mineral volumetric information, porosity, and/or fluid saturation.

11. The method according to claim 1, wherein performing the electrofacies analysis comprises reducing a number of components of a feature vector used for characterizing the subsurface formation from a first number to a second number, wherein the second number of components explains at least a threshold value of a variance of the feature vector.

12. The method according to claim 11, wherein the reducing comprises performing a principal component analysis having an orthogonal linear transformation.

13. The method according to claim 1, wherein defining clusters comprises using a mathematical technique comprising K-mean, agglomerative hierarchical clustering, Gaussian mixture model (GMM), spectral, and/or fuzzy C-mean clustering.

14. The method according to claim 1, wherein defining clusters comprises selecting a clustering algorithm and a number of clusters using a quality metric.

15. The method according to claim 14, wherein the quality metric comprises Silhouette score (SS), Calinski-Harabasz score (CH), Davies-Bouldin score (DB), Bayesian Information Criterion (BIC), minimum/maximum number of elements in a cluster, and/or number of isolated elements in a cluster.

16. The method according to claim 1, wherein the partitioning comprises normalization, smoothing, and quantization of the multi-dimensional high-resolution image data.

17. The method according to claim 1, wherein partitioning comprises extracting geological information from the multi-dimensional high-resolution image data using texture analysis.

18. The method according to claim 17, wherein using texture analysis comprises using a Gray Level Co-occurrence Matrix (GLCM) to convert raw images into attribute images considering different textural aspects, the textural aspects comprising contrast, homogeneity, correlation, and/or entropy within the multi-dimensional high-resolution image data.

19. The method according to claim 1, wherein assigning comprises imposing volumetric rules, petrophysical constraints, and/or geological constraints on the data from the plurality of non-image data logs with respect to the high-resolution depth segments.

20. An apparatus for characterizing a subsurface formation, the apparatus comprising:
a processor configured to:
receive multi-dimensional high-resolution image data of the subsurface formation penetrated by a borehole, the multi-dimensional high-resolution image data obtained using a downhole imaging sensor tool disposed in the borehole;
receive a plurality of non-image data logs, each non-image data log being obtained by a different type of non-imaging sensor tool disposed in the borehole, wherein received data excludes core data and each non-image data log has a resolution that is less than a resolution of the multi-dimensional high-resolution image data;
perform an electrofacies analysis on the plurality of non-image data logs and the multi-dimensional high-resolution image data, the electrofacies analysis comprising defining clusters based on combinations of responses of the non-image data logs that have specific physical values and specific compositional characteristics of a rock interval of the subsurface formation and extracted statistical parameters from the multi-dimensional high-resolution image data, wherein each cluster has a similar property to provide a plurality of electrofacies blocks, each electrofacies block representing a depth interval;
partition the multi-dimensional high-resolution image data into multiple high-resolution segments that share a similar property, feature, and/or pattern for each electrofacies block;
assign data from the plurality of non-image data logs into a corresponding high-resolution segment to provide a multi-dimensional high-resolution data log that characterizes the subsurface formation, the multi-dimensional high-resolution data log comprising mineral volumetric values and porosity values and having a resolution greater than the resolution of each of the non-image data logs;

generate a digital rock model of the subsurface formation using the multi-dimensional high-resolution data log;
perform a flow simulation using the digital rock model to provide flow simulation output; and
determine a formation property from the flow simulation output;
borehole-related equipment configured to perform a borehole-related operation based on the formation property.

* * * * *